United States Patent
Zakharov et al.

(10) Patent No.: US 11,044,258 B2
(45) Date of Patent: Jun. 22, 2021

(54) DECENTRALIZED NETWORK FOR SECURE DISTRIBUTION OF DIGITAL DOCUMENTS

(71) Applicant: KYOCERA Document Solutions Inc., Osaka (JP)

(72) Inventors: Oleg Y. Zakharov, Walnut Creek, CA (US); Dai Shigenobu, Walnut Creek, CA (US); Yoshihiro Shiozawa, Concord, CA (US); Hiroshi Manabe, Walnut Creek, CA (US); Robert M. Mokricki, Berkeley, CA (US); Aaron Sahagun, Pleasant Hill, CA (US)

(73) Assignee: KYOCERA DOCUMENT SOLUTIONS INC.

( * ) Notice: Subject to any disclaimer, the term of this patent is extended or adjusted under 35 U.S.C. 154(b) by 151 days.

(21) Appl. No.: 16/112,553

(22) Filed: Aug. 24, 2018

(65) Prior Publication Data
US 2020/0068013 A1    Feb. 27, 2020

(51) Int. Cl.
*H04L 29/06* (2006.01)
*H04L 9/32* (2006.01)
(Continued)

(52) U.S. Cl.
CPC ............ *H04L 63/123* (2013.01); *G06F 21/10* (2013.01); *G06F 21/6218* (2013.01);
(Continued)

(58) Field of Classification Search
CPC ... H04L 63/123; H04L 9/3236; H04L 67/104; H04L 67/10; H04L 67/1065;
(Continued)

(56) References Cited

U.S. PATENT DOCUMENTS

| 5,638,443 A | 6/1997 | Stefik et al. |
| 7,275,102 B2 * | 9/2007 | Yeager ............... G06F 9/544 |
| | | 709/205 |

(Continued)

FOREIGN PATENT DOCUMENTS

JP    2007-004649 A    1/2007

OTHER PUBLICATIONS

Androutsellis-Theotokis, Stephanos, and Diomidis Spinellis. "A survey of peer-to-peer content distribution technologies." ACM computing surveys (CSUR) 36.4 (2004): 335-371. (Year: 2004).*

(Continued)

*Primary Examiner* — Kari L Schmidt
(74) *Attorney, Agent, or Firm* — GrowIP Law Group LLC

(57) ABSTRACT

Methods and apparatus for distributing documents are provided. A source node can determine a map for a document, where the map can include information about a number of portions of the document and a corresponding number of distribution nodes. The source node can, for each portion of the number of portions of the document, send the portion of the document to the corresponding distribution node. The source node can record, at a distributed storage system, a first transaction that records information related to the map for the document using the source node. The source node can determine to distribute the document. After determining to distribute the document, the source node can: record a second transaction related to a distribution identifier associated with the map for the document at the distributed storage system and can send a distribution notification that comprises the map for the document and the distribution identifier.

20 Claims, 12 Drawing Sheets

US 11,044,258 B2
Page 2

(51) Int. Cl.
  *G06F 21/62* (2013.01)
  *G06F 21/78* (2013.01)
  *G06F 21/10* (2013.01)
  *H04L 29/08* (2006.01)
  *G06F 16/93* (2019.01)

(52) U.S. Cl.
  CPC ............ *G06F 21/78* (2013.01); *H04L 9/3236* (2013.01); *G06F 16/93* (2019.01); *H04L 67/1097* (2013.01)

(58) Field of Classification Search
  CPC ..... H04L 67/1097; G06F 21/10; G06F 21/78; G06F 21/6218
  See application file for complete search history.

(56) References Cited

U.S. PATENT DOCUMENTS

| | | | | |
|---|---|---|---|---|
| 7,529,785 | B1* | 5/2009 | Spertus | G06F 11/1453 |
| 7,734,643 | B1* | 6/2010 | Waterhouse | G06F 16/10 707/770 |
| 7,805,518 | B1* | 9/2010 | Kamvar | H04L 63/126 709/227 |
| 7,844,251 | B2* | 11/2010 | Chen | H04L 67/1095 455/410 |
| 7,925,781 | B1* | 4/2011 | Chan | H04L 69/166 709/203 |
| 8,024,784 | B1* | 9/2011 | Issa | H04L 63/0281 726/9 |
| 8,346,739 | B1* | 1/2013 | Hatton | G06F 16/93 707/694 |
| 8,627,463 | B1* | 1/2014 | Glick | H04L 63/1416 726/22 |
| 9,602,527 | B2* | 3/2017 | Yu | H04L 63/1425 |
| 9,729,616 | B2* | 8/2017 | Mahadevan | G06F 16/955 |
| 9,832,339 | B1* | 11/2017 | Yee | H04N 1/32523 |
| 10,776,761 | B2* | 9/2020 | MacGregor | G06Q 20/223 |
| 2004/0044727 | A1* | 3/2004 | Abdelaziz | H04L 67/107 709/203 |
| 2006/0230072 | A1* | 10/2006 | Partovi | G06Q 10/06 |
| 2007/0130209 | A1* | 6/2007 | Marples | G06Q 30/02 |
| 2007/0156726 | A1* | 7/2007 | Levy | G06F 21/10 |
| 2007/0180078 | A1* | 8/2007 | Murphy | H04L 63/126 709/223 |
| 2007/0198607 | A1* | 8/2007 | Memon | G06F 21/00 |
| 2007/0266169 | A1* | 11/2007 | Chen | H04L 67/104 709/231 |
| 2007/0288638 | A1* | 12/2007 | Vuong | H04L 67/1093 709/226 |
| 2008/0016198 | A1* | 1/2008 | Johnston-Watt | H04L 67/1023 709/223 |
| 2008/0092181 | A1* | 4/2008 | Britt | H04N 21/47202 725/87 |
| 2008/0147861 | A1* | 6/2008 | Oishi | G06F 21/565 709/225 |
| 2008/0154851 | A1* | 6/2008 | Jean | H04L 67/104 |
| 2008/0168135 | A1* | 7/2008 | Redlich | G06F 21/6218 709/204 |
| 2008/0289006 | A1* | 11/2008 | Hock | H04L 67/108 726/4 |
| 2009/0044024 | A1* | 2/2009 | Oberheide | G06F 21/562 713/188 |
| 2010/0250709 | A1* | 9/2010 | Mallett | H04L 67/1082 709/219 |
| 2010/0250917 | A1* | 9/2010 | Marivoet | H04L 67/104 713/150 |
| 2011/0113238 | A1* | 5/2011 | Jennings | H04L 67/1046 713/156 |
| 2012/0117201 | A1* | 5/2012 | Arolovitch | H04N 21/632 709/219 |
| 2012/0166868 | A1* | 6/2012 | Volvovski | H04L 67/1097 714/6.22 |
| 2012/0197962 | A1* | 8/2012 | Maenpaa | H04L 67/1065 709/201 |
| 2012/0233228 | A1* | 9/2012 | Barton | G06F 16/178 707/827 |
| 2014/0006504 | A1* | 1/2014 | Jimenez | H04L 67/1057 709/204 |
| 2014/0032517 | A1* | 1/2014 | Henderson | G06F 16/319 707/706 |
| 2014/0280707 | A1* | 9/2014 | Shukla | H04L 67/1006 709/217 |
| 2015/0007273 | A1* | 1/2015 | Lin | H04L 63/08 726/4 |
| 2015/0163217 | A1* | 6/2015 | Lo | G06F 17/3053 726/6 |
| 2015/0304329 | A1* | 10/2015 | Yan | G06F 21/6218 726/27 |
| 2015/0334066 | A1* | 11/2015 | Haff | H04L 67/1063 726/1 |
| 2016/0366176 | A1* | 12/2016 | Bennison | H04L 63/1441 |
| 2017/0041296 | A1* | 2/2017 | Ford | H04L 63/0421 |
| 2017/0078501 | A1* | 3/2017 | Chang | H04L 67/10 |
| 2017/0329937 | A1 | 11/2017 | Choi et al. | |
| 2018/0032478 | A1* | 2/2018 | Felderman | G06F 40/131 |
| 2018/0316747 | A1* | 11/2018 | Scrivano | H04L 67/2842 |
| 2019/0311148 | A1* | 10/2019 | Andrade | H04L 63/102 |

OTHER PUBLICATIONS

M. Khambatti, Partha Dasgupta and K. D. Ryu, "A role-based trust model for peer-to-peer communities and dynamic coalitions," Second IEEE International Information Assurance Workshop, 2004. Proceedings., Charlotte, NC, USA, 2004, pp. 141-154. (Year: 2004).*

F. Tschorsch and B. Scheuermann, "Bitcoin and Beyond: A Technical Survey on Decentralized Digital Currencies," in IEEE Communications Surveys & Tutorials, vol. 18, No. 3, pp. 2084-2123, thirdquarter2016. (Year: 2016).*

Z. Chen et al., "KFTrust: P2P trust model based on evaluation rank using Kalman filter", May 2015, International Journal of Autonomous and Adaptive Communications Systems, vol. 8, Issue 2/3, abstract only.

efail.de, "EFAIL", May 24, 2018, available via the Internet at efail.de (last visited Aug. 24, 2018).

A. Fisk, "Dynamic Query Protocol", Apr. 1, 2005, available via the Internet at www.ic.unicamp.br/~celio/peer2peer/gnutella-related/gnutella-dynamic-protocol.htm (last visited Jul. 11, 2018).

A. Singh et al., "TrustMe: Anonymous Management of Trust Relationships in Decentralized P2P Systems", Sep. 1, 2003, P2P '03 Proceedings of the 3rd International Conference on Peer-to-Peer Computing, abstract only.

M. Swarup et al., "Design and Implementation of a Secure Multi-cloud Data Storage Using Encryption", May 2014, International Journal of Advanced Research in Computer Engineering & Technology (IJARCET), vol. 3, Issue 5, pp. 1595-1599.

Wikimedia Foundation, "Distributed computing", Jul. 3, 2018, available via the Internet at en.wikipedia.org/w/index.php?title=Distributed_computing&oldid=848614482 (last visited Jul. 11, 2018).

Wikimedia Foundation, "eDonkey network", Mar. 2, 2018, available via the Internet at en.wikipedia.org/w/index.php?title=EDonkey_network&oldid=828345046 (last visited Jul. 11, 2018).

Wikimedia Foundation, "Freenet", Jun. 14, 2018, available via the Internet at en.wikipedia.org/w/index.php?title=Freenet&oldid=845853900 (last visited Jul. 11, 2018).

Wikimedia Foundation, "Gnutella", Apr. 20, 2018, available via the Internet at en.wikipedia.org/w/index.php?title=Gnutella&oldid=837420609 (last visited Jul. 11, 2018).

Wikimedia Foundation, "Kazaa", May 17, 2018, available via the Internet at en.wikipedia.org/w/index.php?title=Kazaa&oldid=841649382 (last visited Jul. 11, 2018).

Wikimedia Foundation, "Napster", Jul. 1, 2018, available via the Internet at en.wikipedia.org/w/index.php?title=Napster&oldid=848354497 (last visited Jul. 11, 2018).

(56) References Cited

OTHER PUBLICATIONS

Wikimedia Foundation, "Soribada", May 24, 2018, available via the Internet at en.wikipedia.org/w/index.php?title=Soribada&oldid=842785782 (last visited Jul. 11, 2018).

* cited by examiner

1100

1110 Determine a map for a document using a source node, the map for the document including information about a number of portions of the document and a corresponding number of distribution nodes

1120 For each portion of the number of portions of the document, send the portion of the document from the source node to the corresponding distribution node

1130 Record a first transaction at a distributed storage system to record information related to the map for the document using the source node

1140 Determine, at the source node, to distribute the document

1150 After determining to distribute the document, the source node:
- Record a second transaction at the distributed storage system, the second transaction related to a distribution identifier associated with the map for the document, and
- Send a distribution notification that includes the map for the document and the distribution identifier

1210 Receive, at a destination node, a distribution notification that includes a map for a document and a distribution identifier, the map for the document including information about a number of portions of the document and a corresponding number of distribution nodes

1220 For each portion of the number of portions of the document, the destination node sends a request for the portion of the document to the corresponding distribution node, where the request comprises the distribution identifier

1230 Receive a document at the destination node by receiving at least one portion of the number of portions of the document

1240 Determine an accuracy of the received document at the destination node

1250 After determining the accuracy of the received document, the destination node sends a notification related to the accuracy of the received document

FIG. 12

DECENTRALIZED NETWORK FOR SECURE DISTRIBUTION OF DIGITAL DOCUMENTS

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server. In some cases, printing devices include scanning components for creating electronic copies of original paper documents. Such printing devices can be used to scan in paper documents and perhaps transmit corresponding electronic copies.

The networks can include many printing devices. Some or all of the printing devices can have different features, functions, and capabilities. Some or all of the printing devices can generate log files to record operations performed using the printing devices, such as printing operations, scanning operations, and document communication operations.

SUMMARY

In one aspect, a method is provided. A source node determines a map for a document. The map for the document includes information about a number of portions of the document and a corresponding number of distribution nodes. For each portion of the number of portions of the document, the source node sends the portion of the document to the corresponding distribution node. The source node records, at a distributed storage system, a first transaction to record information related to the map for the document. The source node determines to distribute the document. After determining to distribute the document, the source node: records a second transaction at the distributed storage system. The second transaction is related to a distribution identifier associated with the map for the document. The source node sends a distribution notification that includes the map for the document and the distribution identifier.

In another aspect, a source node is provided. The source node includes one or more processors and data storage. The data storage is configured to store computer-readable instructions that, when executed by the one or more processors, cause the source node to perform tasks. The tasks include: determining a map for a document that includes information about a number of portions of the document and a corresponding number of distribution nodes; for each portion of the number of portions of the document, sending the portion of the document to the corresponding distribution node; recording a first transaction at a distributed storage system to record information related to the map for the document, determining to distribute the document, and after determining to distribute the document: recording a second transaction at the distributed storage system, the second transaction related to a distribution identifier associated with the map for the document, and sending a distribution notification that comprises the map for the document and the distribution identifier.

In another aspect, an article of manufacture is provided. The article of manufacture includes non-transitory data storage storing at least computer-readable instructions that, when executed by one or more processors of a source node, cause the source node to perform tasks. The tasks include: determining a map for a document that includes information about a number of portions of the document and a corresponding number of distribution nodes; for each portion of the number of portions of the document, sending the portion of the document to the corresponding distribution node; recording a first transaction at a distributed storage system to record information related to the map for the document; determining to distribute the document; and after determining to distribute the document: recording a second transaction at the distributed storage system, the second transaction related to a distribution identifier associated with the map for the document, and sending a distribution notification that comprises the map for the document and the distribution identifier.

In another aspect, a method is provided. A destination node receives a distribution notification that includes a map for a document and a distribution identifier. The map for the document includes information about a number of portions of the document and a corresponding number of distribution nodes. For each portion of the number of portions of the document, the destination node sends a request for the portion of the document to the corresponding distribution node. The request includes the distribution identifier. The destination node receives a document by receiving at least one portion of the number of portions of the document. The destination node determines an accuracy of the received document. After determining the accuracy of the received document, the destination node sends a notification related to the accuracy of the received document.

In another aspect, a destination node is provided. The destination node includes one or more processors and data storage. The data storage is configured to store computer-readable instructions that, when executed by the one or more processors, cause the destination node to perform tasks. The tasks include: receiving a distribution notification that includes a map for a document and a distribution identifier, the map for the document including information about a number of portions of the document and a corresponding number of distribution nodes; for each portion of the number of portions of the document, sending a request for the portion of the document to the corresponding distribution node, where the request includes the distribution identifier; receiving a document by receiving at least one portion of the number of portions of the document; determining an accuracy of the received document; and after determining the accuracy of the received document, sending a notification related to the accuracy of the received document.

In another aspect, an article of manufacture is provided. The article of manufacture includes non-transitory data storage storing at least computer-readable instructions that, when executed by one or more processors of a destination node, cause the destination node to perform tasks. The tasks include: receiving a distribution notification that includes a map for a document and a distribution identifier, the map for the document including information about a number of portions of the document and a corresponding number of distribution nodes: for each portion of the number of portions of the document, sending a request for the portion of the document to the corresponding distribution node, where the request includes the distribution identifier; receiving a document by receiving at least one portion of the number of portions of the document; determining an accuracy of the received document, and after determining the accuracy of the received document, sending a notification related to the accuracy of the received document.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 11 is a flowchart of another method, in accordance with at least some example embodiments.

FIG. 12 is a flowchart of another method, in accordance with at least some example embodiments.

DETAILED DESCRIPTION

Figure 1:
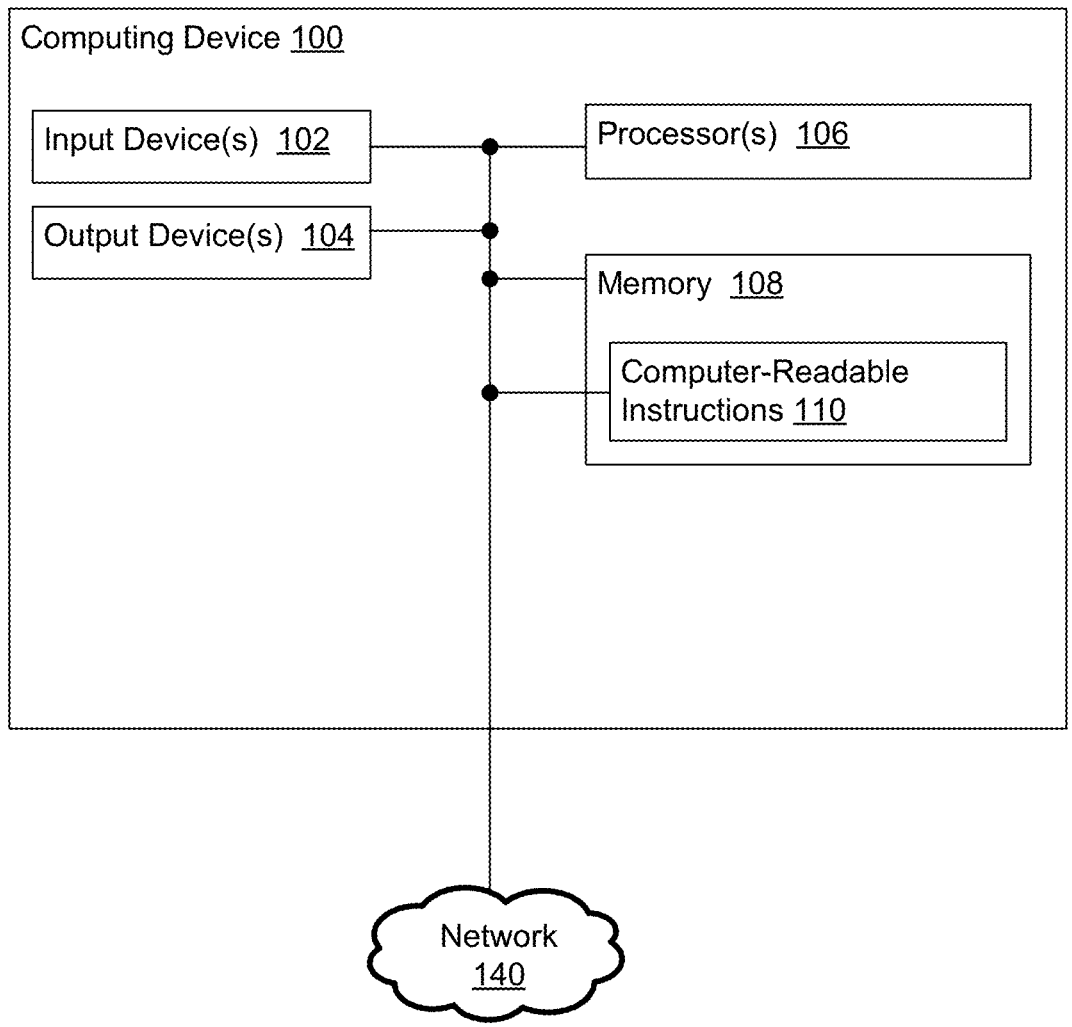
FIG. 1 is a schematic block diagram illustrating a computing device, in accordance with at least some example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

The widespread deployment of computing networks has enabled easy distribution of electronic documents within and between organizations. Such electronic documents can be presented using one or more of a number of digital formats; e.g., a text format, a binary format, a page description format, a Joint Photographic Experts Group (JPEG) format, a Moving Picture Experts Group (MPEG). Once formatted, distribution of electronic documents can be performed using one or more of a number of transport protocols; e.g., HyperText Protocol (HTTP), HTTP Secure (HTTPS), Simple Message Transfer Protocol (SMTP), File Transfer Protocol (FTP), Secure Sockets Layer protocol, Transmission Control Protocol/Internet Protocol (TCP/IP), User Datagram Protocol (UDP).

Distribution of digital documents can lead to unauthorized copying of distributed documents, because of the ease in perfectly replicating electronic documents. In some examples, electronic documents can be protected using DRM (Digital Right Management) techniques, such as encryption/decryption, information leakage prevention, and authorization management. In particular DRM examples, an electronic document can have both human-readable information and machine-readable information, where the machine-readable information can include data for restricting unauthorized copying of the electronic document; e.g., watermarking data. In other DRM examples, DRM software can encrypt electronic documents to protect enterprise confidentiality of the encrypted electronic document. In other DRM examples, DRM software can convert files storing electronic documents into data streams, making original files unavailable and preventing copying of the original files. User permissions of electronic documents and/or data streams can be assigned by a content authority associated with the DRM software. For example, permission to receive content and/or play games online can be granted by the content authority via streaming protocols between a central server and a web browser.

Widespread deployment of small-sized and high-capacity personal storage devices (e.g., Universal Serial Bus (USB) drives, small audio and/or video recorders, smart phones) pose difficulties for DRM software. In particular, the use of these personal storage devices can cause electronic documents to be transported to computing environments where the electronic documents be copied without authorization.

Also, DRM techniques can be less efficient in peer-to-peer (P2P) networks, as peer-to-peer networks can locate data differently from centralized systems. In peer-to-peer networks, a network provides communication between connected computing devices acting as nodes or "peers" of the network by utilizing any commonly agreed upon transport protocol. Peers of the peer-to-peer network can send and/or receive at least some data directly with each other without necessarily utilizing another computing device; e.g., a server computing device.

Some peer-to-peer networks can use a central server to store search indices for each node in the peer-to-peer network. Each node in the peer-to-peer network can send a list of locally held electronic documents to the central server, where the central server can use the lists of electronic documents from the nodes to determine related search indices. Then, the central server can receive a search query (perhaps with key-words) for electronic documents and use the search indices to locate one or more nodes that store queried-for electronic documents. However, the use of a central server can lead to a single point of failure problem; that is, if the central server fails, no queries can be processed.

Other peer-to-peer networks can use a "flooding query model" where a search query can be broadcast to all of the nodes in the peer-to-peer network. While the flooding query model avoids a single point of failure, broadcast queries significantly reduce network performance in comparison to use of a central server. An example optimization to the flooding query model is a: "dynamic querying model", where queries for widely distributed content can be broadcast to a relatively small number of nodes, while searches for rarely distributed content can be broadcast to a relatively large number of nodes.

Other peer-to-peer networks can use a heuristic key-based routing technique, where each electronic document can be associated with a search index, and where electronic documents with similar keywords/indices can be clustered on a similar set of nodes. Queries for electronic documents can be routed through the peer-to-peer network to a cluster or nodes associated with the queried-for electronic documents directly, thereby avoiding sending the query to a relatively-large number of nodes. However, the key-based routing technique does not guarantee that a queried-for electronic document will be found, even if it is stored within the peer-to-peer network.

Herein are described techniques for secure electronic document distribution using a peer-to-peer network, where data security is based on a peer trust ranking. The peer-topeer network can include one or more computing devices acting as nodes. In operation, the nodes of the peer-to-peer network can include source nodes, destination nodes, distribution nodes, and mediator nodes. A source node can be a node that stores a source document or an initial copy of an electronic document. A distribution node can be a node that is used to receive one or more portions of one or more source documents, store at least the portion(s) of the source document(s), retrieve portion(s) of document(s) as requested, and send the retrieved portion(s) of the document(s). A mediator node can be a node that interacts with and/or provides access to one or more distributed storage systems, such as one or more blockchain systems and/or distributed ledgers, to record and/or store data about distributed electronic documents; e.g., transaction data for transactions related to the distributed electronic documents, to receive and process one or more queries related to the stored transaction data, and/or to process and/or communicate trust values related to nodes of the peer-to-peer network. A destination node can be a node that receives a distributed electronic document, where the destination node may be able to determine the accuracy of the distributed electronic document.

Each distributed electronic document can be associated with a specific search index. For example, a search index can be generated using a hash function. Then, the search index can be used as a publically available key to be associated with a document that all other nodes can use in retrieving the document.

More particularly, a source node of the peer-to-peer network can request distributed storage of an electronic document, where the electronic copy to be distributed can be divided into two or more portions. The two or more portions of the source document can be stored by one or more distribution nodes. Decomposition of the source document into portions that are stored by the one or more distribution nodes can improve security of the digital document distribution system. For example, if one source document is divided into three portions stored by three separate distribution nodes, a number of possible combinations of these three portions will be 3!=6. More generally, the number of possible combinations of M distribution nodes that each store one of M portions of a source document is M!

The source node can determine a map for the source document, where the map stores information about: the source document, the two or more portions of the source document, and the one or more distribution nodes that store the portions of the source document. The source document can generate a record map transaction based on the map for the source document, and can provide the record map transaction to a mediator node. For example, upon reception of the record map transaction, the mediator node can store the record map transaction using the distributed storage system.

Then, to distribute an electronic document DED1, the source node for DED1 can generate a search index SI1 for document DED1. The search index information can be sent from the source node for document DED1 to the mediator node as part of a record distribution transaction, where the record distribution transaction can include information about document DED1, the search index SI1, and information about n distribution nodes $DN_1 \ldots DN_n$ (n>0) that are eligible and used to store portions of distributed document DED1. The mediator node can then use the distributed storage system to store the record distribution transaction.

The source node can then send one or more distribution notifications to inform m>0 destination nodes $DEST_1 \ldots DEST_m$ that document DED1 is available for distribution, where a distribution notification can include the search index SI1 and perhaps other data, such as the map of document DED1. Upon reception of a distribution notification, a destination node $DEST_x$ (1≤x≤m) can provide the search index SI1 and the map of document DED1 to each distribution node listed in the map of the document. Upon reception of the search index SI1 and the map of document DED1, a distribution node can use the search index SI1 to query the mediator node about the validity of the distribution notification. The mediator node can determine whether the search index SI1 is a valid search index for one or more portions of a document stored by the distribution node by finding a record distribution transaction RDT1 whose key is based on search index SI1, where the distribution node is a distribution node listed in RDT1. The mediator node can signal to the distribution node that the distribution notification is valid. After determining that the distribution notification is value, the distribution node can send one or more portions of document DED1 to destination node $DEST_x$.

Upon reception of all of the portions of document DED1, destination node $DEST_x$ can determine the accuracy of the received copy of the document DED1. If the received copy of the document DED1 appears to be accurate, destination node $DEST_x$ can indicate to the mediator node that the distribution nodes $DN_1 \ldots DN_n$ listed in the map for document DED1 can be trusted. Alternatively, if the received copy of the document DED1 appears to be inaccurate, destination node $DEST_x$ can indicate to the mediator node that the distribution nodes $DN_1 \ldots DN_n$ storing portions document DED1 may not be trusted.

If destination node DIx indicates that the distribution nodes listed in the map for document DED1 can be trusted (or may not be trusted), the mediator node can then increase (or decrease) a trust value of each of the distribution nodes listed in the map for document DED1. Eligibility of a distribution node to store portions of a distributed document can be determined based on a trust value for the distribution node. For example, each node of a network of nodes that use the herein-described techniques for document distribution can have a trust value that represents an accumulative coefficient of trust. As an example of determining a trust value for a node, the node can start with an initial trust value, the trust value for the node can be incremented each time the node successfully distributes a document, and the trust value for the node can be decremented each time the node unsuccessfully distributes a document. In this example, if the trust value for the node remains larger than a trust-value threshold, then the node can be considered to be eligible to store portions of a distributed document. Otherwise in this example, the trust value for the node is not larger than a trust-value threshold, and the node can then be considered to be ineligible to store portions of a distributed document. Further, when a destination node requests distribution of a document without a valid search index, the trust value of the destination node can be decreased due to an invalid document request. For example, suppose a destination node DN_HACKED sends document requests to nodes 'A', 'B' and 'C' without valid search indices. Then, nodes A, B, and C can each inform a mediator node about the document requests without valid search indices, the mediator node can determine the search requests are invalid, and decrease the trust value for destination node DN_HACKED (and perhaps each of nodes A, B, and C) for providing invalid document requests. If destination node DN_HACKED sends too many invalid document requests, the trust value of destination node DN_HACKED can fall below the trust-value threshold and destination node DN_HACKED can be prohibited from sending document requests. Other examples of maintaining security of distributed documents using trust values of nodes are possible as well.

The herein-described techniques for document distribution enable secure and efficient document distribution in a peer-to-peer network environment. Also, the herein-described techniques for document distribution do not utilize a central authorization mechanism—documents are stored in multiple locations, thereby taking maximal advantage of available storage while avoiding a central point of failure. In some examples, portions of documents can be redundantly stored (e.g., one portion of a document can be stored on multiple distribution nodes), thereby increasing document availability and avoiding a central point of failure in storing even a portion of document. Further, the role of mediator nodes can be provided by multiple physical nodes in the peer-to-peer network, thereby avoiding a central point of failure at a mediator node. The herein-described techniques for document distribution do not involve flooding of network messages and thereby are network efficient. The use of blockchain technologies in distributed storage systems enables secure and distributed storage of transactions associated with document distribution, thereby avoiding a central point of failure for transaction storage. Further, the use of trust values can indicate whether a distribution node has been compromised—if a trust value for a distribution node is below a threshold value, then the distribution node has been indicated as providing inaccurate document portions and therefore appears to be compromised. Compromised distribution nodes can subsequently be avoided for document portion storage, thereby ensuring subsequent security of stored document portions.

II. Computing Device and Printing System Examples

FIG. 1 is a schematic block diagram illustrating computing device 100, in accordance with at least some example embodiments. In some embodiments, computing device 100 can be configured to perform at least part of the herein-described techniques for document distribution and/or functionality related to: a node, a source node, a destination node, a mediator node, a distribution node, network 140, 200, scanning/printing devices (SPDs) 210, 212, 214, 216, computing devices 220, 222, distribution node(s) 230, 710, 712, 714, 716, mediator node(s) 232, distributed storage system 234, methods 300, 400, 500, 1100, 1200, and/or scenario 700.

Computing device 100 can include one or more input devices 102, one or more output devices 104, one or more processors 106 and memory 108. Input devices 102 can include user input devices, network input devices, sensors, and/or other types of input devices. For example, input devices 102 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet® transceiver, a Universal Serial Bus (USB) transceiver, or similar transceiver configurable to communicate via a twisted pair wire, a coaxial cable, a fiber-optic link, or a similar physical connection to a wireline network, such as wired portions of one or more of networks 140, 200 and/or wireless network receivers and/or transceivers, such as a Bluetooth® transceiver, a ZigBee® transceiver, a Wi-Fi® transceiver, a WiMAX™ transceiver, a wireless wide-area network (WWAN) transceiver and/or other similar types of wireless transceivers configurable to communicate via a wireless network, such as wireless portions of one or more of networks 140, 200. Sensors can include devices configured to measure conditions in an environment of computing device 100 and provide data about that environment, such data including, but not limited to, location data, velocity (speed, direction) data, acceleration data, and other data about the environment for computing device 100. Example sensors include, but are not limited to, GPS sensor(s), location sensors(s), gyroscope(s), accelerometer(s), magnetometer(s), camera(s), light sensor(s), infrared sensor(s), and microphone(s). Other input devices 102 are possible as well.

Output devices 104 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of one or more of networks 140, 200 and/or wireless network transmitters and/or transceivers, such as a Bluetooth® transceiver, a ZigBee® transceiver, a Wi-Fi® transceiver, a WiMAX™ transceiver, a wireless wide-area network (WWAN) transceiver and/or other similar types of wireless transceivers configurable to communicate via a wireless network, such as wireless portions of one or more of networks 140, 200. Other types of output devices can include, but are not limited to, vibration devices, haptic feedback devices, and non-visible light emission devices; e.g., devices that emit infra-red or ultra-violet light. Other output devices 104 are possible as well.

Processor(s) 106 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processor(s) 106 can be configured to execute computer-readable instructions 110 that are contained in memory 108 and/or other instructions as described herein.

Memory 108 can include one or more computer-readable storage media configured to store data and/or instructions that can be read and/or accessed by at least one of processor(s) 106. The one or more computer-readable storage media can include one or more volatile and/or non-volatile storage components, such as optical, magnetic, organic or other memory or disc storage, which can be integrated in whole or in part with at least one of processor(s) 106. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 108 can be implemented using a single physical device (e.g., one optical, magnetic, organic or other memory or disk storage unit), while in other embodiments, memory 108 can be implemented using two or more physical devices.

Memory 108 can store computer-readable instructions 110 that, when executed by one or more of processor(s) 106, can cause a computing device (e.g., computing device 100) to perform functions, such as but not limited to, functions related to herein-described procedures, techniques, devices, networks, methods, features, and/or scenarios. In some examples, computer-readable instructions 110 can include instructions to carry out at least part of the herein-described functionality of a node, a source node, a destination node, a mediator node, a distribution node, a network, a scanning/printing device, a computing device, and/or a distributed storage system.

Figure 2:
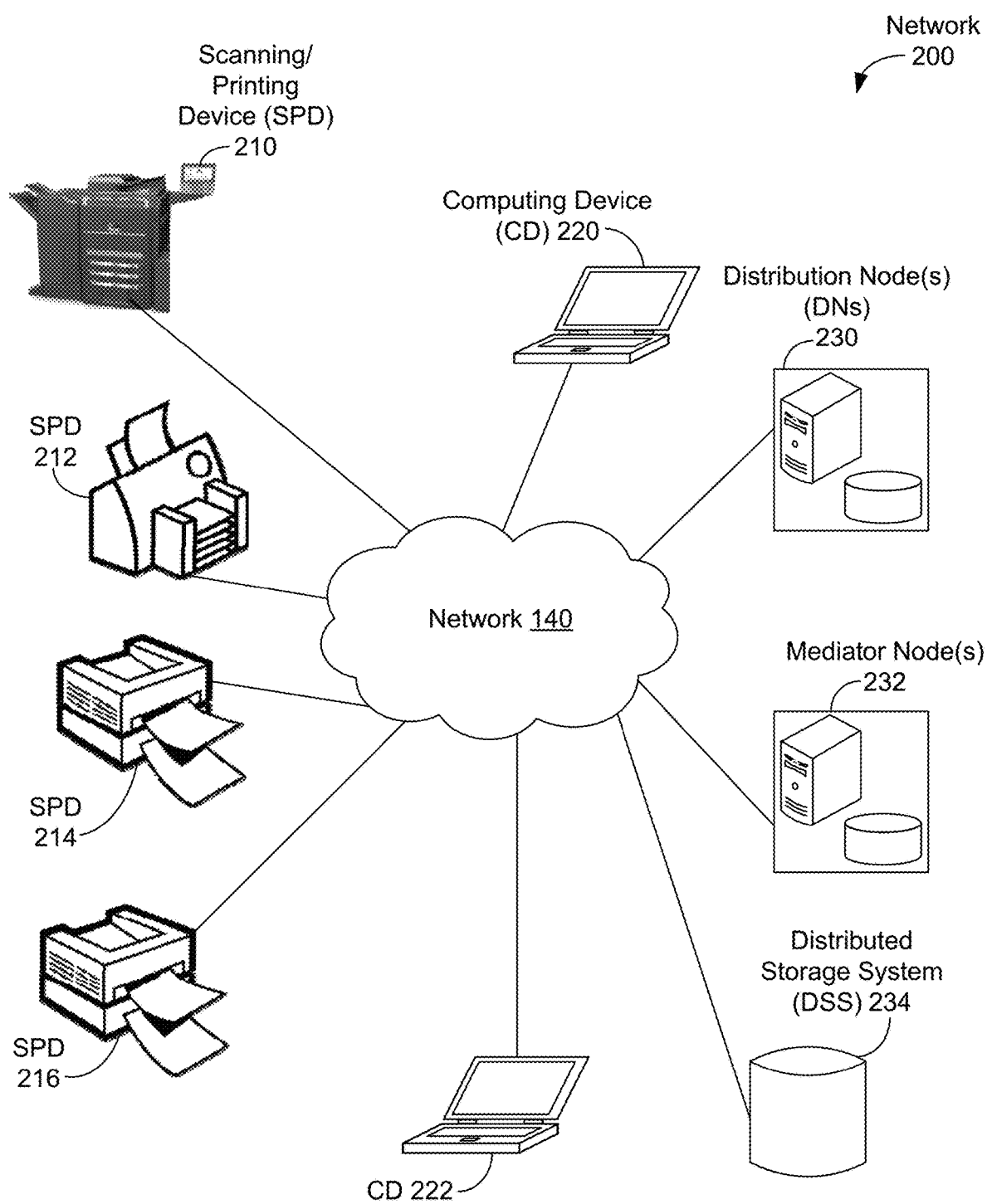
FIG. 2 is a diagram illustrating a network, in accordance with at least some example embodiments.

FIG. 2 is a diagram illustrating network 200, in accordance with at least some example embodiments. Network 200 includes scanning/printing devices 210, 212, 214, 216, computing devices 220, 222, computing devices being used as distribution node(s) 230 and mediator node 232, and distributed storage system 234. In some examples, network 200 can have more, fewer, and/or different types of nodes, scanning/printing devices, computing devices, server computing devices, and/or other devices than indicated in FIG. 2. In some examples, network 200 is a peer-to-peer network with scanning/printing devices 210, 212, 214, 216, computing devices 220, 222, distribution node(s) 230 and mediator node 232, and distributed storage system 234 acting as peers while being connected by network 140.

Scanning/printing devices 210, 212, 214, 216 can include components configured to scan, print, copy, e-mail, account for, communicate and/or otherwise process documents and/or files that are originally available either on paper or electronically. For example, some or all of scanning/printing devices 210, 212, 214, 216 can include scanning components for creating electronic copies of original paper documents and/or for generating electronic data via OCR or other techniques from the original paper documents; e.g., generating paper-form data from a paper form or other paper document. After processing by one or more of scanning/printing devices 210, 212, 214, 216, the paper-form data, documents, and/or files can be subsequently available either on paper or electronically, as requested. That is, scanning/printing devices 210, 212, 214, 216 can process a paper document PAPERD or electronic document ED by at least: creating an electronic document ED1 representing the contents of PAPERD (e.g., scan PAPERD to create ED1), making one or more paper copies of PAPERD, printing one or more copies of ED and/or ED1 on one or more types of paper, make one or more electronic copies of ED and/or ED1, change a format of ED and/or ED1 (e.g., perform OCR) scanning, convert a file format used to store ED and/or ED1), maintain remotely-accessible storage (e.g., a document box) enabling other devices than scanning/printing devices 210, 212, 214, 216 to use/access ED and/or ED1, and/or communicate the contents of ED and/or ED1 to/from another device. In some cases, creating the electronic document ED1 representing the contents of PAPERD can include creating paper-form data PFD representing part or all of the contents of PAPERD.

A document box can be storage allocated to an entity (e.g., a user, an administrator, a company, another type of entity) on a printing device, a scanning/printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits. In some examples, the herein-described techniques for document distribution can be used for one or more documents stored in a document box.

In some examples, scanning/printing devices 210, 212, 214, 216 can perform other tasks and/or other processing as well. Scanning/printing devices 210, 212, 214, 216 can include products from various manufacturers with variations in color, speed, computing power, functionality, network connectivity, and/or other features.

In some examples, some or all of scanning/printing devices 210, 212, 214, 216 can be connected to network 140 through one or more, possibly different, network protocols. Data can be transmitted between scanning/printing devices 210, 212, 214, 216, computing devices 220, 222, distribution node(s) 230, mediator node(s) 232, and/or distributed storage system 234, over wired and/or wireless links between computers, computing devices, nodes, printing devices, scanning/printing devices, servers, and network 140. The format of each respective data transmission between devices in network 200 can include one or more of a variety of different formats including: text formats, image formats, extensible mark-up language (XML), Simple Network Maintenance Protocol (SNMP) formats, database tables, text including OCR'd text, a flat file format, or another format.

Communications between the computers, computing devices, nodes, printing devices, scanning/printing devices, servers, can include: computing devices 220, 222, distribution node(s) 230, mediator node(s) 232, and/or distributed storage system 234 sending and/or receiving data for scanning and printing jobs performed by scanning/printing devices 210, 212, 214, 216; scanning/printing devices 210, 212, 214, 216 sending alert, status, error, device information, colorant-usage information, maintenance-event information, and/or other messages to computing device 220 and/or computing device 222; and a document management system (not shown in FIG. 2) to inform other devices about colorant-usage, maintenance, error, and/or other conditions of the printing devices and/or scanning/printing devices; e.g., idle, printing, sleeping, paper jam, low or out of paper, low or out of toner/ink, etc.; and scanning/printing devices 210, 212, 214, 216, computing devices 220, 222, distribution node(s) 230, mediator node(s) 232, and/or distributed storage system 234 sending and/or receiving data related to securely storing and/or retrieving documents as described herein. Other communications between nodes, computing devices, scanning/printing devices 210, 212, 214, 216, computing devices 220, 222, distribution node(s) 230, mediator node(s) 232, and/or distributed storage system 234, are possible as well, such as, but not limited to, communications related to one or more maintenance and management operations.

In some examples, computing devices 220, 222 can create, obtain, update, display, distribute, store, retrieve, and/or delete documents using network 200. For example, computing device 220 and/or computing device 222 can act as a herein-described source node, a herein-described destination node, a herein-described distribution node, and/or a herein-described mediator node.

Distribution node(s) 230 can include one or more computing devices, each acting as a herein-described destination node. In some examples, one or more of distribution node(s) 230 can also act as a herein-described source node, a herein-described destination node, and/or a herein-described mediator node.

Mediator node(s) 232 can include one or more computing devices, each acting as a herein-described mediator node. In some examples, one or more of mediator node(s) 232 can also act as a herein-described source node, a herein-described destination node, and/or a herein-described distribution node. In some examples, mediator node(s) 232 can include a plurality of mediator nodes arranged as a network of mediator nodes all configured to access a distributed storage system; e.g., distributed storage system 234; e.g., a peer-to-peer network with mediator nodes acting as peers. Then, suppose one mediator node of the network of mediator nodes failed. Then, a non-mediator node can utilize another mediator node of the network of mediator nodes to access the distributed storage system.

Distributed storage system 234 can provide storage at least for a distributed storage system utilized by the herein-described techniques for document distribution. In some examples, distributed storage system 234 can communicate with one or more other computing and/or data storage devices that can provide storage for one or more distributed storage systems utilized by the herein-described techniques for document distribution.

Data for distributed storage systems can be communicated using network 200. This data about one or more distributed storage systems can include, but is not limited to, data related to document distribution that is stored in the one or more distributed storage systems, blocks, hash values, timestamps, block headers, notifications, (e.g., a notification of an added block), distributed storage system queries and query responses, cryptographic keys, and entire distributed storage systems. Other data can be communicated using network 200 as well.

In some embodiments, one or more additional computing devices, e.g., one or more servers, printing devices, scanning/printing devices, nodes, and/or other computing devices, can be used in network 200 to perform additional functions, such as functions for one or more document solutions and managed print services, prediction-related functions, act as databases, provide machine learning functionality, and other functions.

III. Techniques for Securely Distributing Documents

Figure 3:
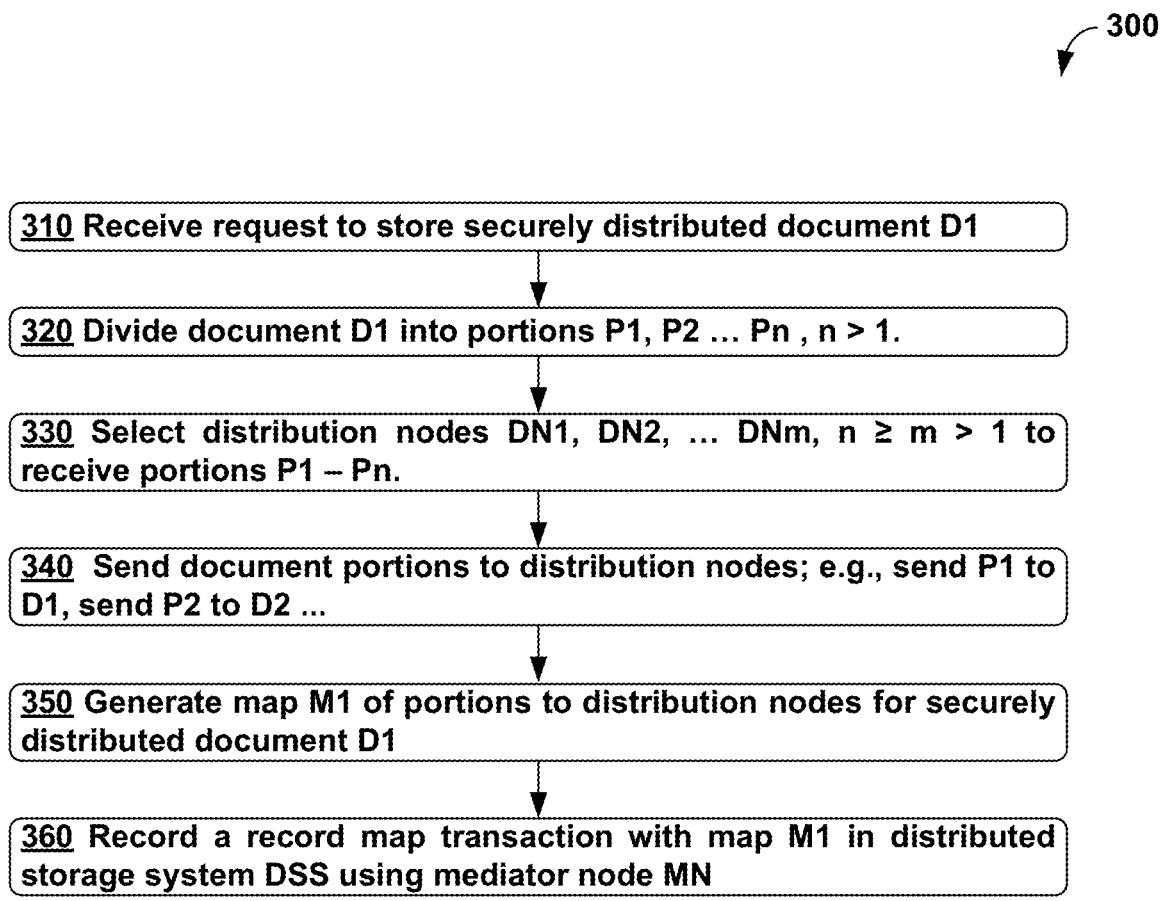
FIG. 3 is a flowchart illustrating a method, in accordance with at least some example embodiments.

FIG. 3 is a flowchart of method 300, in accordance with at least some example embodiments. Method 300 can be carried out by a computing device, such as computing device 100 discussed above, acting as a source node.

Method 300 can begin at block 310, where the source node can receive a request to store securely distributed document D1. For example, a user interface of the source node can be used to generate the request to store securely distributed document D1.

At block 320, the source node can divide document D1 into n portions, P1, P2 . . . Pn, where n>1. A portion of document D1 can be determined based on a division of pages document D1; e.g., for n=4, a first portion of document D1 can include upper left corners of pages of document D1, a second portion of document D1 can include lower left corners of pages of document D1, a third portion of document D1 can include upper right corners of pages of document D1, and a fourth portion of document D1 can include lower right corners of pages of document D1. Portions of document D1 can be determined by selecting bits, words, pixels, characters, or other representations of document D1. For example, suppose n=8, then a first portion of document D1 can include a first bit (or word or pixel or character) out of each group of eight bits (or words or pixels or characters) in document D1, a second portion of document D2 can include a second bit (or word or pixel or character) out of each group of eight bits (or words or pixels or characters) and so on until reaching an eighth portion of document D1, which can include an eighth bit (or word or pixel or character) out of each group of eight bits (or words or pixels or characters). Other techniques for determining portions of document D1 are possible as well.

At block 330, the source node can select m distribution nodes DN1, DN2 . . . DNm, n≥m>1 to receive corresponding portions P1, P2 . . . Pn. In some cases, m=n, and so each distribution node can be selected to receive one corresponding portion of document D1. In other cases, m<n, and so at least one distribution node can be selected to receive multiple corresponding portions of document D1.

At block 340, the source node can send the document portions P1, P2 . . . Pn to the m distribution nodes. For example, if m=n, then the source node can send: document portion P1 to distribution node DN1, document portion P2 to distribution node DN2 . . . and send document portion Pn to distribution node DNm.

At block 350, the source node can generate a map M1 of portions to distribution nodes for securely distributed document D1. For example, map M1 for document D1 can include information about document D1 (e.g., a name of document D1, a hash value of document D1), information about portions of document D1, and information about distribution nodes storing the portions of document D1. As an example, map M1 for a four-part division of document D1 can have a "DocumentMap" format illustrated in Table 1 below.

TABLE 1

```
DocumentMap {
    MapName: M1;
    DocumentName: D1;
    DocumentNumber: 123;
    NumDocumentPortions: 4
    PortionListing {
        Portion[1]:{ancor:topleft,dest_node_loc:URI1};
        Portion[2]:{ancor:topright,dest_node_loc:URI2};
        Portion[3]:{ancor:bottomleft,dest_node_loc:URI3};
        Portion[4]:{ancor:bottomright,dest_node_loc:URI4};
    }
}
```

Table 1 illustrates that the DocumentMap format for a document map can include: a map name "MapName", document identifiers including a "DocumentName" and a "DocumentNumber", a number of document portions "NumDocumentPortions", and a "PortionListing" providing information about portions of the document. Table 1 shows an example document map in DocumentMap format, where the document map has a map name of "M1", a document name of "D1", a document number of "123", where document D1 is divided into "4" portions. The four portions of document D1 are listed as indicating a physical division of pages of document D1, where "Portion[1]" has "top" "left" portions of pages of document D1 and is stored by a distribution node that can be accessed via uniform resource identifier (URI) "URI1", "Portion[2]" has "top" "right" portions of pages of document D1 and is stored by a distribution node that can be accessed via uniform resource identifier "URI2", "Portion[3]" has "bottom" "left" portions of pages of document D1 and is stored by a distribution node that can be accessed via uniform resource identifier "URI3", and "Portion[4]" has "bottom" "right" portions of pages of document D1 and is stored by a distribution node that can be accessed via uniform resource identifier "URI4". Each of the uniform resource identifiers URI1, URI2, URI3, and URI4 for respective document portions 1, 2, 3, and 4 can include information about a distribution node storing the respective document portion and a name of a file or other storage structure used to store the respective document portion at the distribution node. For example, if document portion 1 is stored by a destination node "DNode23" in a file "D1_P1_20180629_182334" stored in directory "DocParts", then an example of URI1 could be "//DNode23/DocParts/D1_P1_20180629_182334". In other examples, a document map and/or the DocumentMap format can have more, less, and/or different information than indicated above with respect to Table 1.

At block 360, the source node can record a record map transaction with map M1 in distributed storage system DSS using mediator node MN. Distributed storage system DSS can include a distributed ledger; e.g., a block-chain, that records information about document distribution transactions and trust values of nodes used to distribute documents for each node in a peer-to-peer network for document distribution. Mediator node MN can provide access to distributed storage system DSS for non-mediator nodes in the peer-to-peer network and can synchronize the distributed ledger between nodes in the peer-to-peer network. To record the record map transaction, the source node can send the record map transaction to mediator node MN, and mediator node MN can store the record map transaction in the distributed ledger provided by distributed storage system DSS. As such, the procedures of block 360 can be used to record the record map transaction of the distribution of document D1 to distribution nodes DN1, DN2 . . . DNm, in the distributed ledger. Upon completion of the procedures of block 360, method 300 can be completed.

In some examples, method 300 can also include providing one or more related outputs, e.g., one or more outputs related to the source node, document D1, portions P1, P2 . . . Pn, distribution nodes DN1, DN2 . . . DNm, map M1, distributed storage system DSS, mediator node MN, and/or a record map transaction and perhaps other outputs. The output(s) can be visual, audible, and/or haptic outputs and can be provided by the source node, at least one of distribution nodes DN1, DN2 . . . DNm, distributed storage system DSS, mediator node MN, and/or one or more other computing devices.

Figure 4:
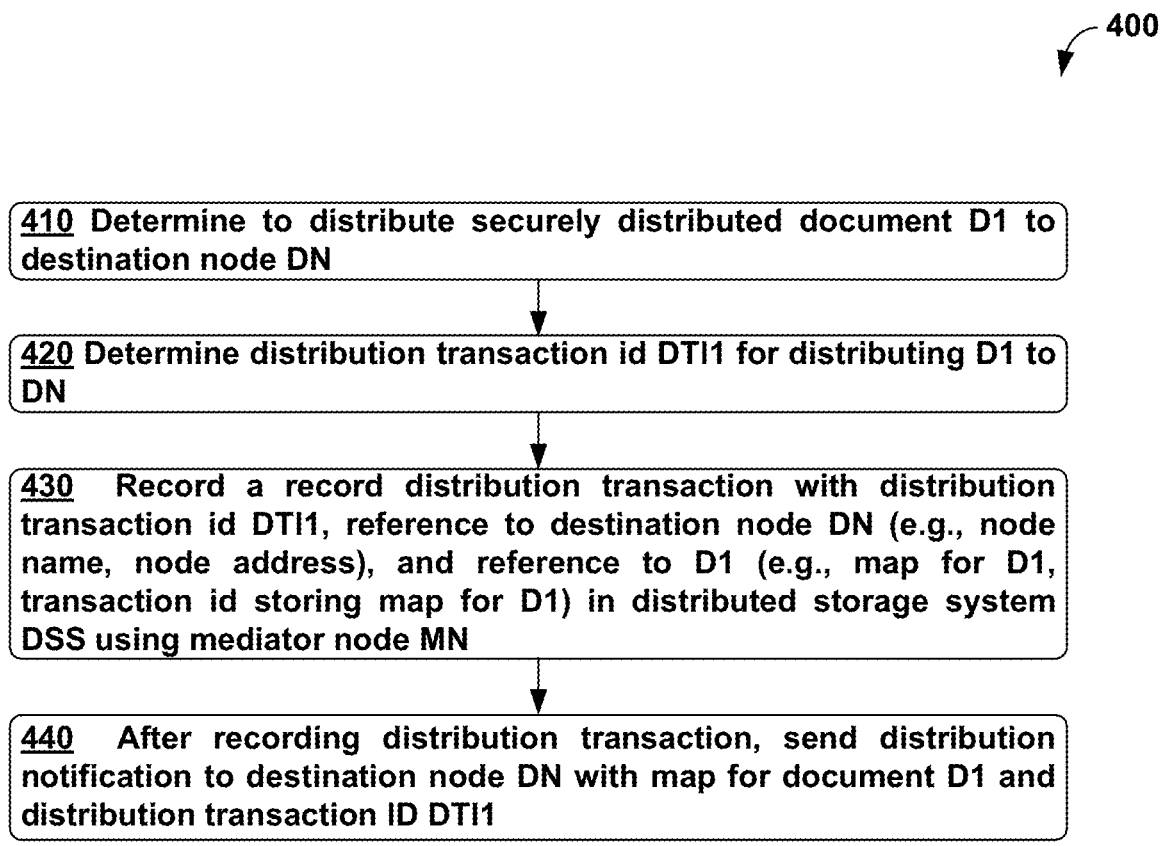
FIG. 4 is a flowchart illustrating another method, in accordance with at least some example embodiments.

FIG. 4 is a flowchart of method 400, in accordance with at least some example embodiments. Method 400 can be carried out by a computing device, such as computing device 100 discussed above, acting as a source node.

Method 400 can begin at block 410, where the source node can determine to distribute securely distributed document D1 to destination node DN. For example, a user interface of the source node can be used to generate a request to distribute securely distributed document D1.

At block 420, the source node can determine a distribution transaction identifier DTI1 for distributing D1 to a destination node DN. The source node can use a function, such as a hash function, and/or one or more techniques to generate distribution transaction identifier DTI1. For example, the source node can use a hash function operating on input data including part or all of document D1 and perhaps a time stamp or other time-sensitive information to generate a hash value. Then, that hash value can be used distribution transaction identifier DTI1.

At block 430, the source node can record a record distribution transaction in distributed storage system DSS using mediator node MN. The record distribution transaction can include distribution transaction id DTI1, a reference to destination node DN (e.g., a node name, a node address), and a reference to document D1 (e.g., a document map for D1, a reference to a transaction storing a document map for D1). To record the record distribution transaction, the source node can send the record distribution transaction to mediator node MN, and mediator node MN can store the record distribution transaction in a distributed ledger provided by distributed storage system DSS. As such, the procedures of block 430 can be used to record the record distribution transaction in the distributed ledger, where the record distribution transaction can enable distribution of document D1 from one or more distribution nodes storing document D1 to destination node DN. In other examples, the record distribution transaction can include more, less, and/or different information.

In some examples, distribution transaction identifier DTI1 can be used as a search index by other nodes to determine whether a request to distribute D1 to destination node DN is valid. For example, after distribution transaction identifier DTI1 is stored as part of the record distribution transaction in distributed storage system DSS, then a later query can be presented to mediator node MN and/or distributed storage system DSS to search for distribution transaction identifier DTI1. In this example, the query would find the record distribution transaction storing distribution transaction identifier DTI1, and mediator node MN and/or distributed storage system DSS could then send a response (e.g., a response that a request for part or all of a document is valid) based on the fact that the record distribution transaction storing distribution transaction identifier DTI1 was found stored in distributed storage system DSS. In another example, a query presented to mediator node MN and/or distributed storage system DSS with a supposed distribution transaction identifier that was not already stored in distributed storage system DSS. In this other example, the query would not find the supposed distribution transaction identifier, and mediator node MN and/or distributed storage system DSS could then send a response (e.g., a response that a request for part or all of a document is invalid) based on the fact that the supposed distribution transaction identifier was not found stored in distributed storage system DSS.

At block 440, after recording the record distribution transaction, the source node can send a distribution notification to destination node DN. The distribution notification can include a map for document D1 and a distribution transaction identifier (ID) DTI1. In other examples, the distribution notification can include more, less, and/or different information. Upon completion of the procedures of block 440, method 400 can be completed.

In some examples, method 400 can also include providing one or more related outputs, e.g., one or more outputs related to the source node, document D1, destination node DN, distribution transaction identifier DT1, a document map, a document reference, a distribution notification, distributed storage system DSS, mediator node MN, and/or a record distribution transaction and perhaps other outputs. The output(s) can be visual, audible, and/or haptic outputs and can be provided by the source node, destination node DN, distributed storage system DSS, mediator node MN, and/or one or more other computing devices.

Figure 5:
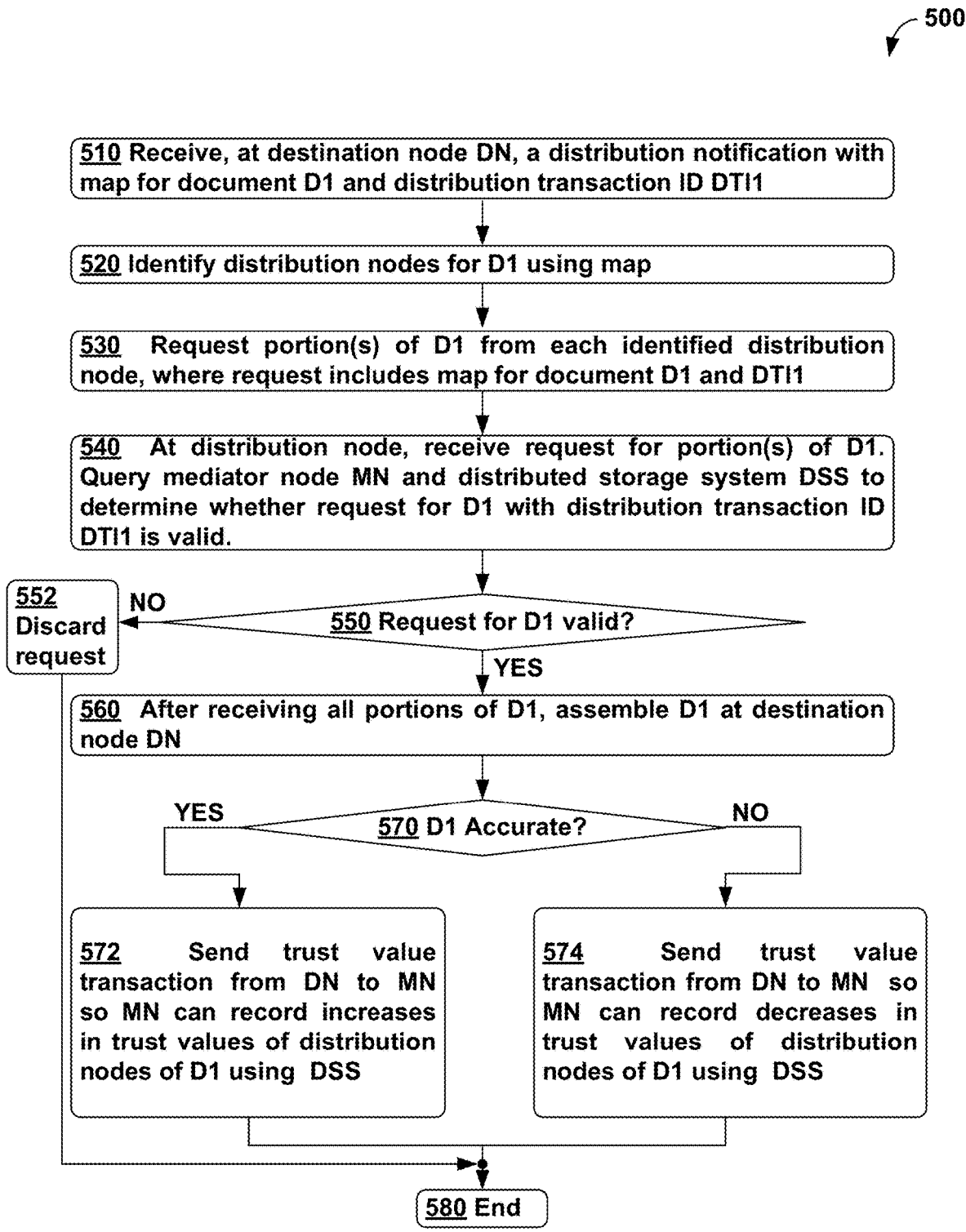
FIG. 5 is a flowchart illustrating another method, in accordance with at least some example embodiments.

FIG. 5 is a flowchart of method 500, in accordance with at least some example embodiments. Method 500 can be carried out by one or more computing devices, such as computing device 100 discussed above, acting as one or more nodes.

Method 500 can begin at block 510, where a destination node DN can receive a distribution notification with a map for document D1 and a distribution transaction identifier DTI1. The distribution notification can inform destination node DN that a securely distributed document—in this example, document D1—is available for retrieval. The map for a document is discussed above in more detail in the context of block 350 of method 300.

At block 520, destination node DN can identify one or more destination nodes storing one or more portions of document D1 from the map received at block 510. For example, if the map for document D1 has the format indicated by the example map shown in Table 1 above, destination node DN can identify the destination node(s) using the uniform resource indicators of the portion listing in the map.

At block 530, destination node DN can send a request to each destination node identified at block 520 for the one or more portions of document D1 stored by the destination node. The request sent to the destination node can include the map and the distribution transaction identifier DTI1 received at block 510.

In some examples, a distribution node only knows about the portion (or portions) of document D1 that it stores; that is, the distribution node need not know about other distribution nodes and/or other portions of document D1, thereby increasing security of document storage. In particular of these examples, the request sent to the destination node can include a partial map, where the partial map does not refer to all portions of document D1. Rather, a partial map MAP_P1 for a destination node DNODE_P1 only refers to the one or more portions of document D1 stored by destination node DNODE_P1. In these examples, destination node DNODE_P1 receiving the partial map MAP_P1 is not informed about other destination nodes associated with/storing the document. Further, each of the other destination nodes associated with/storing the document can receive their own partial maps that only refers to the one or more portions of document D1 stored by that destination node. As such, if m destination nodes store different portions of document D1, then m different partial maps can be provided to the m destination nodes.

At block 540, each destination node identified at block 530 can receive a request for one or more portions of document D1. Each destination node that receives a request for document D1 can query mediator node MN and distributed storage system DSS to determine whether the request for document D1 with distribution transaction identifier DTI1 is valid. For example, mediator node MN can query distributed storage system DSS using distribution transaction identifier DTI1 as a search index to look for a transaction TRX1 requesting distribution of document D1 where TRX1 includes DTI1. For example, transaction TRX1 can be a distribution transaction discussed herein at least in the context of FIG. 4.

If distributed storage system DSS stores the transaction TRX1 requesting distribution of document D1 and if transaction TRX1 includes DTI1, the query provided by mediator node MN to distribution storage system DSS can be successful. In response to the successful query, mediator node MN can indicate at block 540 that the request for document D1 with distribution transaction identifier DTI1 is valid. Otherwise, the query provided by mediator node MN to distribution storage system DSS is unsuccessful, and mediator node MN can indicate at block 540 that the request for document D1 with distribution transaction identifier DTI1 is invalid.

At block 550, a determination can be made as to whether the request for document D1 is valid. For example, the validity of the request for document D1 can be based on whether mediator node MN responded at block 540 to indicate that the request of document D1 with distribution transaction identifier DTI1 is valid. If the request for document D1 is valid, method 500 can proceed to block 560. Otherwise, the request for document D1 is invalid and method 500 can proceed to block 552.

At block 552, the request for document D1 is discarded as invalid. In some examples, a trust value of destination node DN and/or a trust value of the distribution node querying the mediator node can be reduced since the request for document D1 is invalid. After completing the procedures of block 552, method 500 can proceed to block 580.

At block 560, the request for document D1 is determined to be valid, and so the distribution node receiving the request for portion(s) of document D1 can provide the portion(s) of document D1 stored by the distribution node as identified in the map of document D1 received at block 540 to destination node DN. Also at block 560, destination node DN can receive all of the portions of document D1 from the distribution nodes identified at block 520 and assemble the portions of D1 into a copy of D1 using the map for document D1 received at block 510.

At block 570, destination node DN can determine whether the copy of document D1 assembled at block 560 is accurate. For example, destination node DN can display the copy of document D1 and request user input as to whether the assembled copy of document D1 is accurate.

As another example, the map of document D1 can include hash sums calculated by the source node for each portion of document D1. Then, destination node DN can calculate hash sums of each received portion of document D1. Destination node DN can, for each received portion of document D1, compare the hash sum calculated by destination node DN with the hash sum for the portion as recorded in the map of document D1. If each of the calculated hash sums is equal to the corresponding hash sum recorded in the map, destination node DN can determine the assembled copy of D1 is accurate. Otherwise, at least one calculated hash sum differs from a corresponding hash sum recorded in the map, and destination node DN can determine the assembled copy of D1 is inaccurate. A related technique for determining accuracy of document D1 can be based on comparing a hash sum of document D1 stored in the map with a hash sum calculated for the assembled copy of D1—if the hash sums are (or are not) equal, then the assembled copy of D1 can be determined to be accurate (or inaccurate). Other techniques for determining accuracy of the assembled copy of D1 is accurate are possible as well.

If destination node DN determines that the assembled copy of document D1 is accurate, then method 500 can proceed to block 572. Otherwise, destination node DN determines that the assembled copy of document D1 is inaccurate and method 500 can proceed to block 574.

At block 572, since the assembled copy of document D1 is accurate, destination node DN can send a trust value transaction to mediator node MN to increase the trust values of distribution nodes of D1 storing portions of document D1. Then, mediator node MN can record the trust value transaction using distributed storage system DSS and can increase trust values of distribution nodes of D1 storing portions of document D1. In some examples, at block 572, mediator node MN can increase a trust value of destination node DN, since destination node DN provided a valid request for document D1. Upon completion of the procedures of block 572, method 500 can proceed to block 580.

At block 574, since the assembled copy of document D1 is inaccurate, destination node DN can send a trust value transaction to mediator node MN to decrease the trust values of distribution nodes of D1 storing portions of document D1. Then, mediator node MN can record the trust value transaction using distributed storage system DSS and can decrease trust values of distribution nodes of D1 storing portions of document D1. In some examples, at block 574, mediator node MN can decrease a trust value of destination node DN, since destination node DN provided an invalid request for document D1.

At block 580, method 500 can end. In some examples, once block 580 is reached, method 500 can partially or completely restart rather than end; e.g., after destination node DN reaches block 580, destination node DN can proceed to block 510 to await receipt of another distribution notification.

In some examples, method 500 can also include providing one or more related outputs, e.g., one or more outputs related to document D1, destination node DN, distribution transaction identifier DT1, a portion of document D1, a request for a portion of a document, a document map, a document reference, a distribution notification, distributed storage system DSS, mediator node MN, a query related to mediator node MN, a trust value, and/or a trust value transaction and perhaps other outputs. The output(s) can be visual, audible, and/or haptic outputs and can be provided by destination node DN, distributed storage system DSS, mediator node MN, and/or one or more other computing devices.

Figure 6:
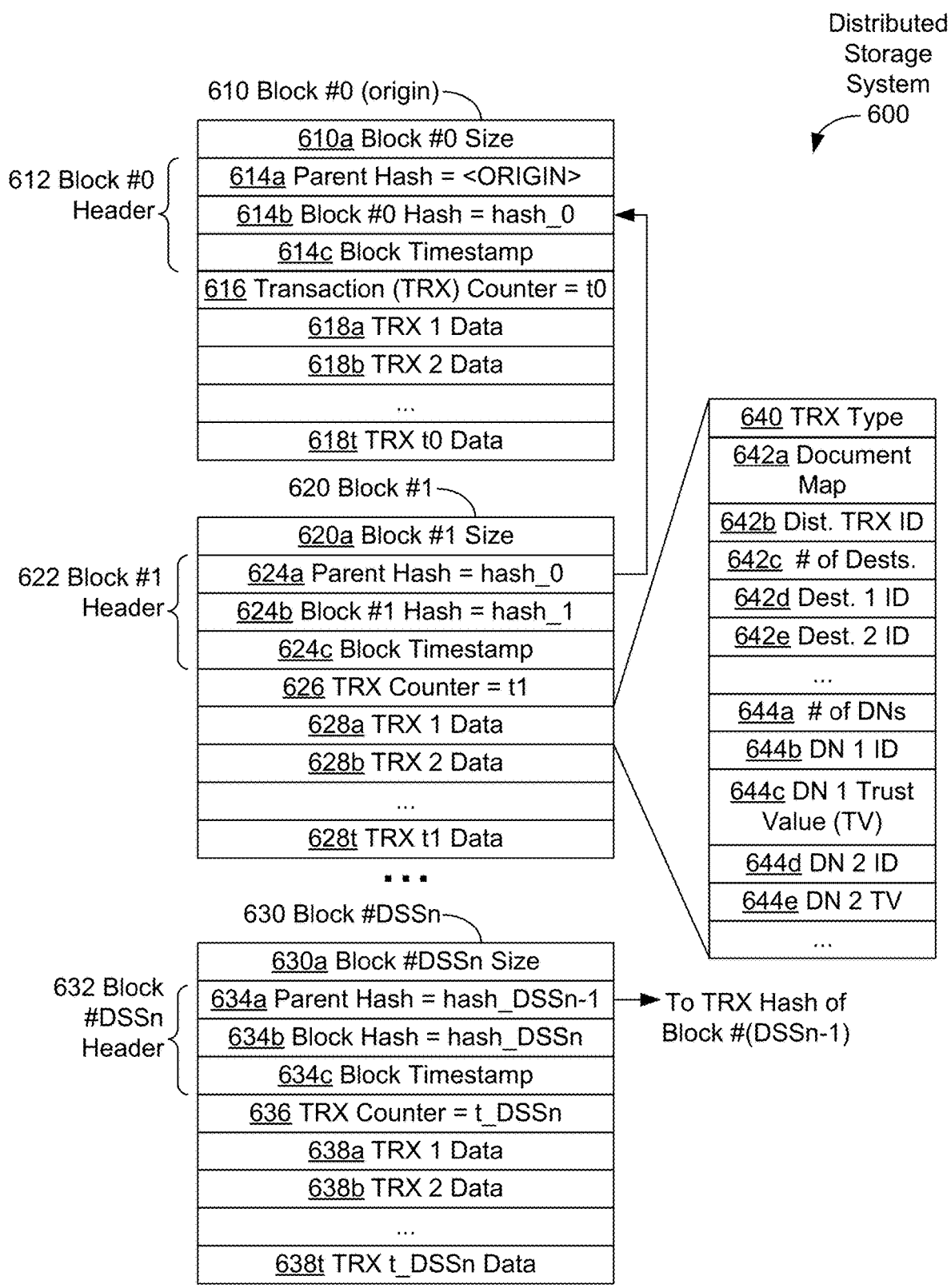
FIG. 6 is a diagram of a distributed storage system, in accordance with at least some example embodiments.

FIG. 6 is a diagram of distributed storage system 600, in accordance with at least some example embodiments. A herein-described distributed storage system (e.g., distributed storage system, distributed storage system DSS) can include some or all of the features described in the context of distributed storage system 600.

Distributed storage system 600 can be shared or distributed with multiple nodes. In some examples, a storage system based on distributed storage system 600 can be stored on only one node, and thereby not be distributed among multiple nodes.

Distributed storage system 600 includes DSSn blocks that include block 610 numbered as block #0, block 620 numbered as block #1, and block 630 numbered as block #DSSn. Each of blocks 610, 620, and 630 is formatted using a format that includes a number of items of data. For example, block 610 has block size item 610a, a parent hash item 614a, a block hash item 614b, a block timestamp item 614c, a transaction counter item 616, and items 618a, 618b . . . 618t for storing transactions related to document distribution in block 610. Similarly, block 620 has block size item 620a, parent hash item 624a, block hash item 624b, block timestamp item 624c, transaction counter item 626, and items 628a, 628b . . . 628t for storing transactions related to document distribution in block 620. Further, block 630 has block size item 630a, parent hash item 634a, block hash item 634b, block timestamp item 634c, transaction counter item 636, and items 638a, 638b . . . 638t for storing transactions related to document distribution in block 630.

A block size item, as illustrated by block size items 610a, 620a, 630a, can record a size; e.g., in bytes or other data storage units, of a block in distributed storage system 600. For example, if block #0 is 1536 bytes in size, block size item 610a can have a value of 1536. As another example where the data storage units are bits and where 8-bit bytes are used, if block #0 is 1536 bytes in size, block size item 610a can have a value of 12288. Other examples, e.g., using words as storage units, are possible as well.

A parent hash item, as illustrated by parent hash items 614a, 624a, 634a, can record a hash value for the paper-form data and/or metadata and/or stored in paper-form data items of a prior or parent block. In the origin block—block #0 labeled block 610 in FIG. 6—the parent hash value can have a predetermined value shown as "<ORIGIN>" in parent hash item 614a of FIG. 6. The predetermined value can be a fixed value; e.g., 0, −1, or another number, a hash value calculated for a predetermined data string; e.g., a hash value of a known phrase or other group of words, such as "This is the parent hash string.", or another predetermined value; e.g., a predetermined number of digits of a well-known value such as π or e.

A prior block to block B is a block created and placed into distributed storage system 600 before block B. Then, a parent block B1 to a block, such as block B, is an immediately prior block; that is, block B1 is the block created and placed into distributed storage system 600 directly before block B. For example, block 610 is prior to blocks 620 and 630, but is only immediately prior to block 620 and thus block 610 is the parent block for block 620. In cases where DSSn>2, block 620 would not be the parent block to block 630; rather, block 620 would be the parent block to block #2 (block #2 not shown in FIG. 6 for the example where DSSn>2).

In all other blocks than the origin block, a parent hash item can store a parent hash value of a parent block of distributed storage system 600. For example, parent hash item 624a of block 620 can store a value "hash_0" that is the hash value stored for transaction data stored in parent block 610, which also stores the value "hash_0" in block hash item 614b. Thus, each block in distributed storage system 600 includes information about a parent block, except for block 610 (which is the origin block for distributed storage system 600).

A block hash item, as illustrated by block hash items 614b, 624b, 634b, can store a block hash value for transaction data stored in transaction data items of a corresponding block. A hash value in distributed storage system 600; e.g., a parent hash value stored in a parent hash item, a block hash value stored in a block hash item, can be calculated using a hash function. For example, the hash function can include a secure hash function that is based on a secure hash algorithm. One set of secure hash algorithms include the Secure Hash Algorithm (SHA) family of algorithms published by the National Institute of Standards and Technology (NIST), such as the family including the SHA-0, SHA-1, SHA-2, SHA-3, SHA256, SHA384, and SHA512 secure hash algorithms.

The secure hash function can receive an input, such an input including transaction data, and generate a corresponding fixed-size output hash value. To calculate hash values, a hash function can perform a series of operations on the input; e.g., permute portions (e.g., bytes) of the input, perform bit manipulations, add/subtract/multiply/divide by pre-determined or other values, execute other functions on part or all of the input, etc.

The hash function can be selected to be secure; in this context, a secure hash function is a function that is difficult to invert, and to have a large enough range of output hash values to make collisions, or two different inputs with the same output hash values, unlikely. In the context of distributed storage system 600, the input, such as transaction data, can be verified as not having been modified by recalculating the hash value using the secure hash function and comparing the recalculated hash value to the hash value for the input stored in distributed storage system 600—if the recalculated hash value equals the hash value stored in distributed storage system 600, the input has very likely not been modified; otherwise, the input has very likely been modified.

In one example, the SHA256 secure hash algorithm can be used by a hash function to generate cryptographically secure hash values that can be used as hash values in distributed storage system 600. Other example uses of secure hash algorithms, other secure hash algorithms (e.g., the Message Digest 4 and 5 (MD4 and MD5) secure hash algorithms; the BLAKE family of secure hash algorithms, the RACE Integrity Primitives Evaluation Message Digest (RIPEMD) family of secure hash algorithms), other hash functions, and/or other hash values for distributed storage system 600 are possible as well.

A block timestamp item, as illustrated by block timestamp items 614c, 624c, 634c, can record a time of creation of the block.

To communicate information about a block in distributed storage system 600 without sending a complete block, a block header can be communicated. For example, to verify, validate, or otherwise provide information about a block B, the block header for block B can be communicated. The block header for block B can include a parent hash item value for block B, a block hash value for block B, and block timestamp value for block B. For example, FIG. 6 shows that block #0 header 612 for block #0 610 includes values of parent hash item 614a, block hash item 614b, and block timestamp item 614c. FIG. 6 also shows block #1 header 622 for block #1 620 that includes values of parent hash item 624a, block hash item 624b, and block timestamp item 624c and shows block #DSSn header 632 for block #DSSn 630 that includes values of parent hash item 634a, block hash item 634b, and block timestamp item 634c. In other examples, more, less, and/or different data can be in a block header.

A transaction counter item, as illustrated by transaction (TRX) counter items 616, 626, 636, can include data about a number, or count, of transactions stored in a block of distributed storage system 600. For example, if block #0 stores data for 13 transactions, then transaction counter item 616 can be set to a value t0=13. Each block of distributed storage system 600 can store a different number of transactions depending on the size of the block.

A transaction data item, as illustrated by items 618a, 618b . . . 618t; 628a, 628b . . . 628t; 638a, 638b . . . 638t, can store information about a transaction related to document distribution. For example, a transaction data item can store the transaction related to document distribution and/or metadata for the transaction related to document distribution, for a block and/or for a distributed storage system. Examples of metadata for the transaction related to document distribution, for a block and/or for a distributed storage system. include, but are not limited to, timestamps, data about a node that sent the transaction, data about a node that received the transaction, document data, document portion data, document map data, search index data, distribution transaction identifier data, trust value data, a name and/or type of the transaction, and cryptographic keys related to one or more blocks and/or one or more distributed storage systems.

The information about a transaction related to document distribution stored in a transaction data item can be stored in specific data and metadata items. For example, at right of FIG. 6, transaction data item 628a has been expanded to show that transaction data can include a transaction type item 640, a document map item 642a, a distributed transaction identifier 642b, a number of destination nodes 642c, destination node 1 identifier 642d, destination node 2 identifier 642e, a number of distribution nodes 644a, distribution node 1 identifier 644b, distribution node 1 trust value 644c, distribution node 2 identifier 644d, and distribution node 2 trust value 644e.

Transaction type item 640 can store one or more types, classifications, names, numbers, and/or or other identifiers of a transaction. For example, transaction type item 640 can store data identifying a transaction related to document distribution as a record map transaction, a record distribution transaction, or a trust value transaction.

Document map item 642a can store a partial or a complete document map for a document. Distributed transaction identifier 642b can store a distributed transaction identifier associated with a distribution of the document whose map is stored in document map item 642a. In some examples, a mediator node can query a distributed storage system to find a record distribution transaction having a distributed transaction identifier matching distributed transaction identifier 642b already stored for a record distribution transaction; that is, the distributed transaction identifier can be used as a search index (or key) to find a record distribution transaction. Then, if the record distribution transaction is found, a request to distribute a corresponding document can be considered to be valid; otherwise, the request to distribute a corresponding document can be considered to be invalid.

Number of destination nodes 642c can indicate a count (or number) of destination nodes that are eligible to receive a distributed document as part of one record distribution transaction; e.g., if a document is intended to be distributed to three destination nodes as part of one transaction, then number of destination nodes 642c would equal three. Destination node 1 identifier 642d, destination node 2 identifier 642e, etc. can collectively identify one or more destination nodes eligible to receive a distributed document as part of one record distribution transaction.

Number of distribution nodes 644a can indicate a count (or number) of distribution nodes that store a distributed document and whose trust values are updated as part of a trust value transaction; e.g., if a document is stored using four distribution nodes whose trust values are updated as part of one trust value transaction, then number of distribution nodes 644a would equal four. In cases where destination node trust values can be updated as part of a trust value transaction, number of distribution nodes 644a can indicate a count (or number) of distribution nodes that store a distributed document and/or destination nodes that received the distributed document. Distribution node 1 identifier 644b can identify a first distribution node whose trust value is updated as part of a trust value transaction and distribution node 1 trust value 644c can indicate the update to the trust value of the first distribution node. The update to the trust value can specify a change in trust value (e.g., a change of +0.01 to add $\frac{1}{100}^{th}$ to an actual trust value) or an actual trust value (e.g., a trust value of 99.32). Similarly, distribution node 2 identifier 644d can identify a second distribution node whose trust value is updated as part of a trust value transaction and distribution node 2 trust value 644e can indicate the update to the trust value of the second distribution node. In some embodiments, a transaction data item can include more, fewer, and/or different data.

In other examples, a block in distributed storage system 600 can include more, fewer, and/or different items of data. For example, in particular examples, each block of distributed storage system 600 can have the same size; e.g., each of block size items 610a, 620a, 630a have the same value. In more particular of these examples, each amount of transaction data in distributed storage system 600 has the same size when stored in a block—then, as blocks and stored amounts of transaction data have fixed sizes, the number of amounts of transaction data stored in a block is a constant value, and so each of transaction counter items 616, 626, 636 has the same values. In some of these examples, block size items and/or transaction counter items can be omitted from blocks in distributed storage system 600 as being redundant. In still other examples, amounts of transaction data as stored can have different sizes; then, a block of distributed storage system 600 can have items of data related to the size of each transaction stored in transaction data items within the block. Many other examples of more, fewer, and/or different items of data are possible as well.

In some blockchain examples, a challenge value, such as a value representing a solution to a pre-determined (difficult) problem, has to be provided by a node prior to the node creating a block; e.g., a challenge value has to be "mined" or computed to earn the right to create a block. In the example distributed storage system shown in FIG. 6, no challenges are recorded or required for block creation. In other embodiments, a challenge can be required and/or one or more corresponding challenge values can be recorded with a block as part of block creation.

FIGS. 7, 8, 9, and 10 illustrate scenario 700 for securely distributing document 718 and later retrieval of the document, in accordance with at least some example embodiments. Scenario 700 begins with scanning/printing device 210 carrying out method 300 and acting as a source node to securely store a document 718 named "doc1". To securely store doc1, scanning/printing device 210 physically divides doc1 into four portions, the four portions of doc1 are stored on four distribution nodes 710, 712, 714, 716, and scanning/printing device 210 stores a record map transaction that includes a document map for doc1 on distributed storage system 234 using mediator node 232. Scenario 700 continues with scanning/printing device 210 carrying out method 400 to send a distribution notification to computing device 222 indicating doc1 is available and to record a record distribution transaction on distributed storage system 234 using mediator node 232. Computing device 222, acting as a destination node carrying out method 500, requests distribution nodes 710, 712, 714, 716 provide their respective portions of doc1. Upon reception of the four portions of doc 1, destination node/computing device 222 assembles doc1 and indicates that assembled copy of doc1 is accurate. Then, destination node/computing device 222 send a trust value transaction to mediator node 232 to increase the trust values of the four distribution nodes 710, 712, 714, 716 that stored doc1. After the trust values of distribution nodes 710, 712, 714, 716 are updated, scenario 700 ends.

Figure 7:
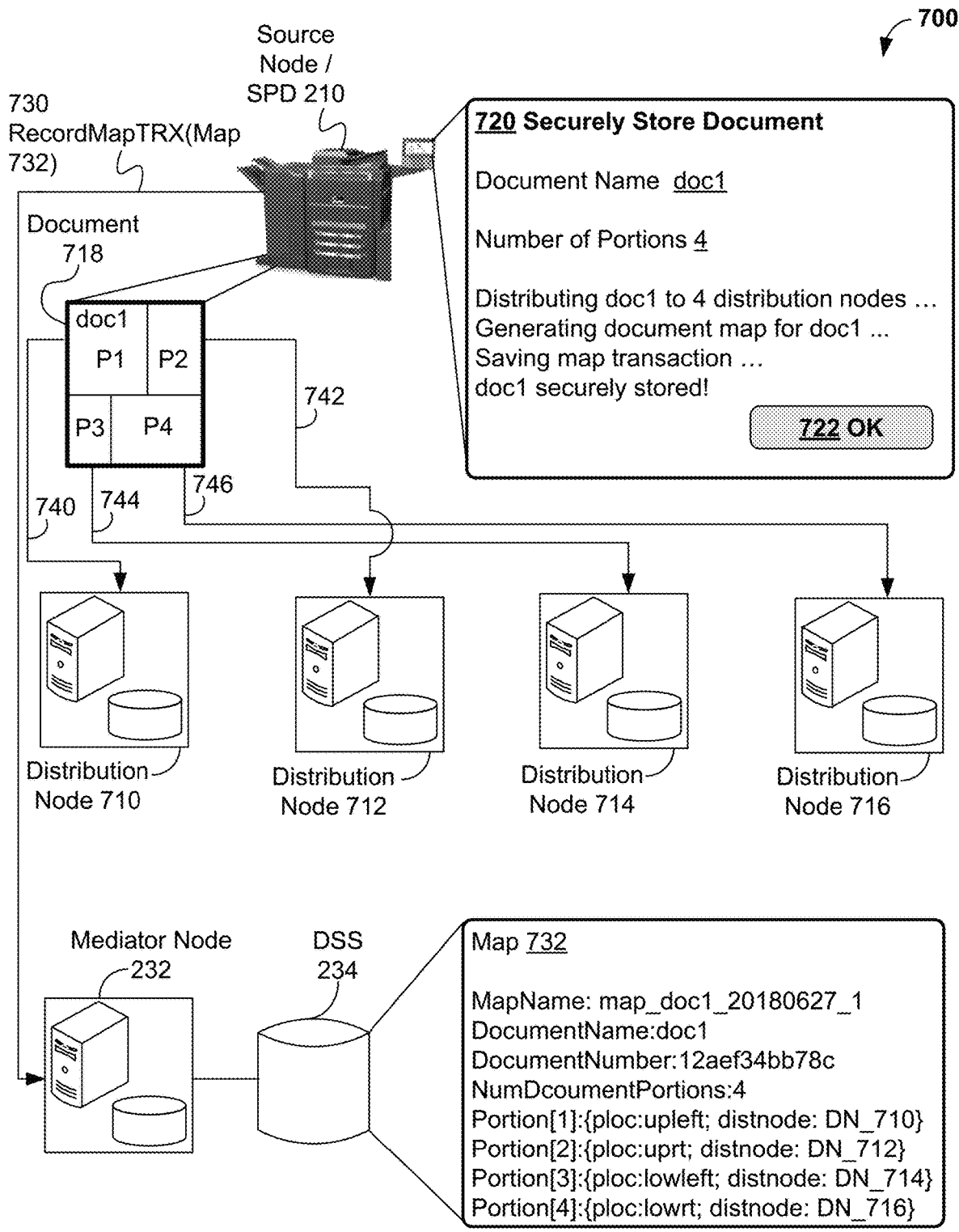
FIGS. 7, 8, 9, and 10 illustrate a scenario for securely distributing a document and later retrieval of the document, in accordance with at least some example embodiments.

FIG. 7 shows that scenario 700 begins with scanning/printing device 210 providing dialog 720 for "Securely Stor[ing a] Document". Dialog 720 enables a user of scanning/printing device 210 to provide a "Document Name" and a "Number of Portions" for securely storing a document. In scenario 700, dialog 720 is used to request secure storage of document 718 named "doc1", where document 718 is divided into "4" portions for secure distributed storage. To proceed with secure storage of document 718/doc1, the user selects the OK button 722, which is shown in grey in FIG. 7 to indicate its selection. Upon selection of OK button 722, scanning/printing device 210 begins to carry out method 300 by receiving the request for secure storage of document 718.

After OK button 722 is selected, scanning/printing device 210, acting as a source node carrying out method 300, physically divides document 718 into four portions—a portion P1 representing upper left corners of pages of document 718, a portion P2 representing upper right corners of pages of document 718, a portion P3 representing lower left corners of pages of document 718, and a portion P4 representing lower right corners of pages of document 718. Scanning/printing device 210 also selects four distribution nodes 710, 712, 714, and 716 to receive respective portions P1, P2, P3, and P4 of document 718. Scanning/printing device 210 then sends respective portions P1, P2, P3, P4 of document 718 to respective distribution nodes 710, 712, 714, 716 for storage.

The nodes of scenario 700 are arranged in a peer-to-peer network. As such, the peer-to-peer network of scenario 700 includes scanning/printing device 210, computing device 220, mediator node 232, distributed storage system 234, and distribution nodes 710, 712, 714, 716 acting as peers of each other while being connected by a network such as network 140.

After selection of distribution nodes 710, 712, 714, 716, scanning/printing device 210 carries out method 300 to generate document map 732 for secure distributed storage of document 718. As shown at lower right of FIG. 7, map 732 includes: a map name of "map_doc1_20180627_1", a document name for document 718 being securely stored is "doc1", a document number for document 718 of "12aef34bb78c", a number of portions of "4" that document 718 is divided into for secure storage. Map 732 also indicates that portion "1" of document 718 (shown in FIG. 7 as portion P1) is for a "ploc" or physical location of document 718 of the "upleft" or upper left portion of pages of document 718, and that portion 1 is stored with "distnode" or distribution node "DN_710". Similarly, map 732 also indicates that respective portions "2", "3", and "4" of document 718 (shown in FIG. 7 as respective portions P2, P3, and P4) are for respective physical locations of document 718 of "uprt" (upper right), "lowleft" (lower left), and "lowrt" (lower right) portion of pages of document 718, and that respective portions 2, 3, and 4 of document 718 are stored with respective distribution nodes "DN_712", "DN_714", and "DN_716".

After map 732 is generated, scanning/printing device 210 generates record map transaction 730 to register (or record) that a document; e.g., document 718, has been securely stored. Record map transaction 730 includes map 732 as a parameter having information about the document that has been securely stored; e.g., a name of the document, a number of portions of the distributed document, locations of distribution nodes storing the portions of the document. In other scenarios, a record map transaction can have more, fewer, and/or different parameters.

FIG. 7 shows progress of the secure storage of document 718 in dialog 720 by indicating that scanning/printing device 210 "[d]istribut[es] doc1 to 4 distribution nodes", "[g]enerat[es] document map for doc1", "[s]av[es] map transaction", and indicates that "doc1 [is] securely stored". In other scenarios, dialog 720 provides more, less, and/or different progress information than shown in FIG. 7.

Scanning/printing device 210 then sends record map transaction 730 to mediator node 232. Mediator node 232 then stores record map transaction 730 in a distributed ledger of distributed storage system 234. Scanning/printing device 210 sends document portions P1, P2, P3, P4 to respective distribution nodes 710, 712, 714, 716 using respective messages 740, 742, 744, 746. In response to receiving messages 740, 742, 744, 746, each respective distribution node 710, 712, 714, 716 retrieves its respective document portion P1, P2, P3, P4 from its received message and stores the respective document portion P1, P2, P3, P4 in a region of memory allocated for storage of document portions.

In scenario 700, document portions P1, P2, P3, P4 are stored by respective distribution nodes 710, 712, 714, 716 in an unencrypted and uncompressed format. In other scenarios, a document portion can be encrypted and/or compressed by a distribution node storing the document portion and/or by the source node and can subsequently be decrypted and/or decompressed by the distribution node storing the document portion and/or by a device receiving the document portion (e.g., a destination node).

In scenario 700, storage of transactions, such as record map transaction 730, and storage of portions P1, P2, P3, P4 of document 718 are not acknowledged as being successful (or, in other scenarios, unsuccessful). In other scenarios, mediator node 232 can send an acknowledgment of storage of a transaction, such as record map transaction 730, to scanning/printing device 210, where the acknowledgment indicates the successful or unsuccessful storage of the transaction by distributed storage system 234. In other scenarios, some or all of distribution nodes 710, 712, 714, 716 can send respective acknowledgments of storage of portions P1, P2, P3, P4 of document 718 to scanning/printing device 210 indicating successful or unsuccessful storage of a portion of document 718.

Figure 8:
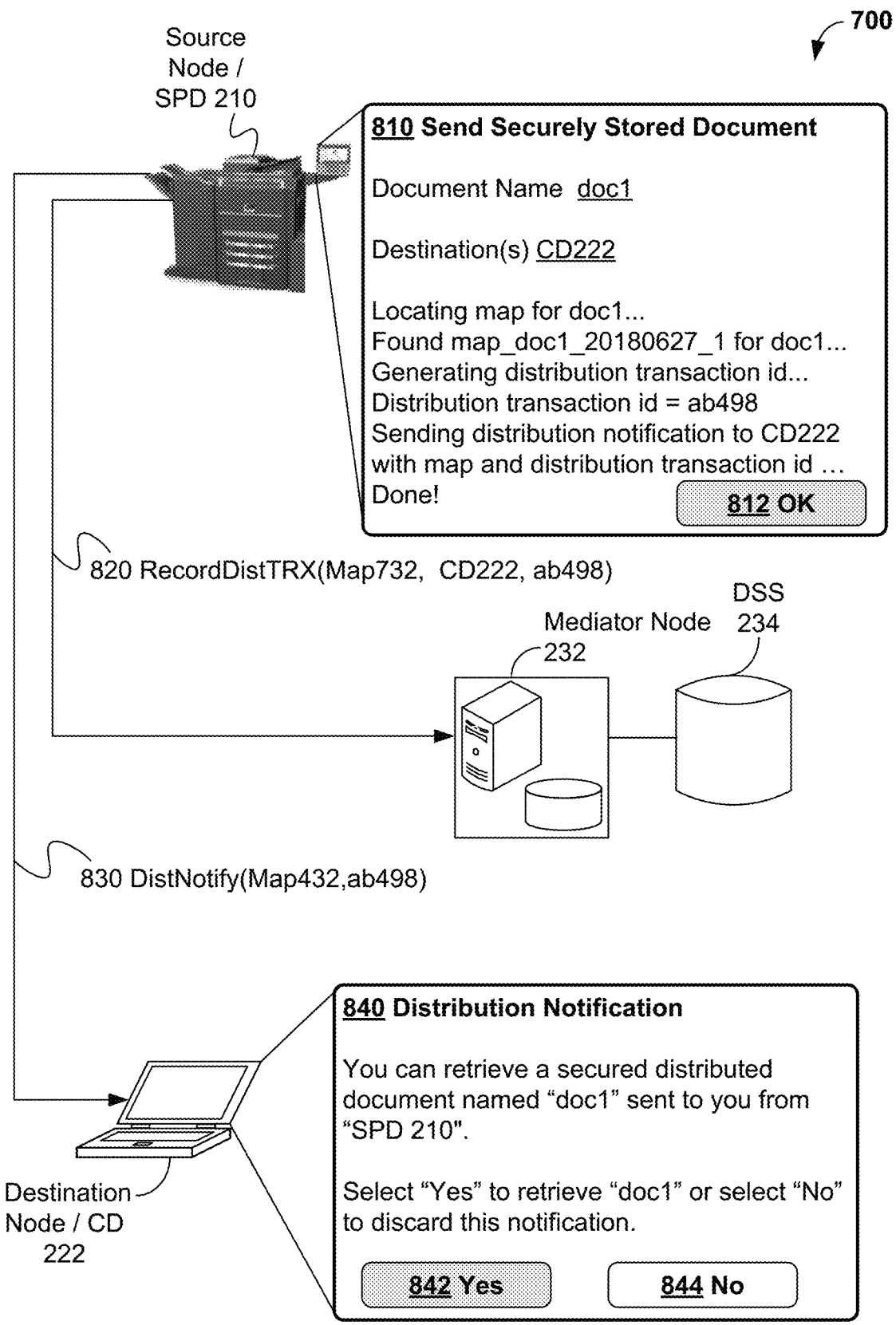

FIG. 8 shows that scenario 700 continues with scanning/printing device 210 carrying out method 400 by providing dialog 810 to determine whether to "Send [a] Securely Stored Document". Dialog 810 enables a user of scanning/printing device 210 to provide a "Document Name" and one or more "Destinations" to enable scanning/printing device 210 to distribute a copy of a securely stored document. In scenario 700, dialog 810 is used to request distribution of securely stored document 718 named "doc1" to a destination node "CD222", where "CD222" is a name for computing device 222. To proceed with distribution of securely stored document 718/doc1, the user selects the OK button 812, which is shown in grey in FIG. 8 to indicate its selection.

After OK button 812 is selected, scanning/printing device 210 locates map 732 for "doc1" (that is, document 718) selected for distribution using dialog 810. For example, scanning/printing device 210 can locate map 732 by searching one or more document maps for a document map with a document name that is "doc1" as input via dialog 810. Dialog 810 records progress of scanning/printing device 210 by indicating that scanning/printing device 210 is first "[l]ocating map for doc1" and then has "found map_doc1_20180627_1 for doc1", where "map_doc1_20180627_1" is the map name for map 732. In other scenarios, dialog 810 provides more, less, and/or different progress information that shown in FIG. 8.

Scanning/printing device 210 can continue with the procedures of method 400 to generate a distribution transaction identifier for a transaction of distributing document 718 to computing device 220. As indicated by dialog 810, the distribution transaction identifier for the transaction of distributing document 718 to computing device 220 is "ab498".

After generating the distribution transaction identifier, scanning/printing device 210 proceeds with method 400 by generating record distribution transaction 820 to register (or record) the transaction of distributing document 718 to computing device 220. Record distribution transaction 820 has a parameter whose value is map 732 to indicate the document being distributed, a parameter for one or more destination nodes for the document whose value is "CD222" as a name of computing device 222, and a parameter whose value is "ab498": for a distribution transaction identifier for a specific transaction of distributing document 718 In other scenarios, a record distribution transaction can have more, fewer, and/or different parameters. For example, data other than a name of a device, such as "CD222", can be used to identify a destination and/or a destination node for a distributed document; e.g., a user name and/or password for a user to receive the distributed document, a security token, certificate, and/or other information to authenticate a destination and/or a destination node for the distributed document, a network address, a partially or fully qualified domain name, a uniform resource indicator.

In other scenarios, a record distribution transaction can both record that a document has been securely stored and that the document is being distributed; that is, the record distribution transaction can act as a record map transaction as well. For example, a first instance of a record distribution transaction to distribute a particular document can also (implicitly) record that the particular document has been securely stored. In some of these other scenarios, a user interface combining features of dialogs 720 and 810 can be used to receive inputs and provide progress information about both secure storing and distributing a document.

Scenario 700 continues with scanning/printing device 210 sending record distribution transaction 820 to mediator node 232. Mediator node 232 then stores record distribution transaction 820 in the same distributed ledger of distributed storage system 234 used to store record map transaction 730.

Scanning/printing device 210 then generates distribution notification 830 having two parameters: a parameter indicating a document being distributed whose value is map 732 (representing document 718) and a parameter indicating a distribution transaction identifier for the specific transaction of distributing document 718 whose value is ab498.

Scenario 700 continues with scanning/printing device 210 carrying out method 400 to send distribution notification 830 to computing device 222. Computing device 222 begins to carry out method 500 acting as a distribution node by receiving distribution notification 830. Upon reception of distribution notification 830, computing device 222 generates and displays dialog 840, which includes yes button 842 and no button 844.

Dialog 840 informs a user of computing device 222 of reception of distribution notification 830 by indicating that the user "can retrieve a secured distributed document named 'doc1' that was "sent" from a device named "SPD 210"; that is, scanning/printing device 210. Dialog 840 also informs the user that yes button 842 can be selected "to retrieve 'doc1'" or that not button 844 can be selected "to discard this notification". In scenario 700, yes button 842 is selected to indicate that "doc 1" is to be retrieved.

Figure 9:
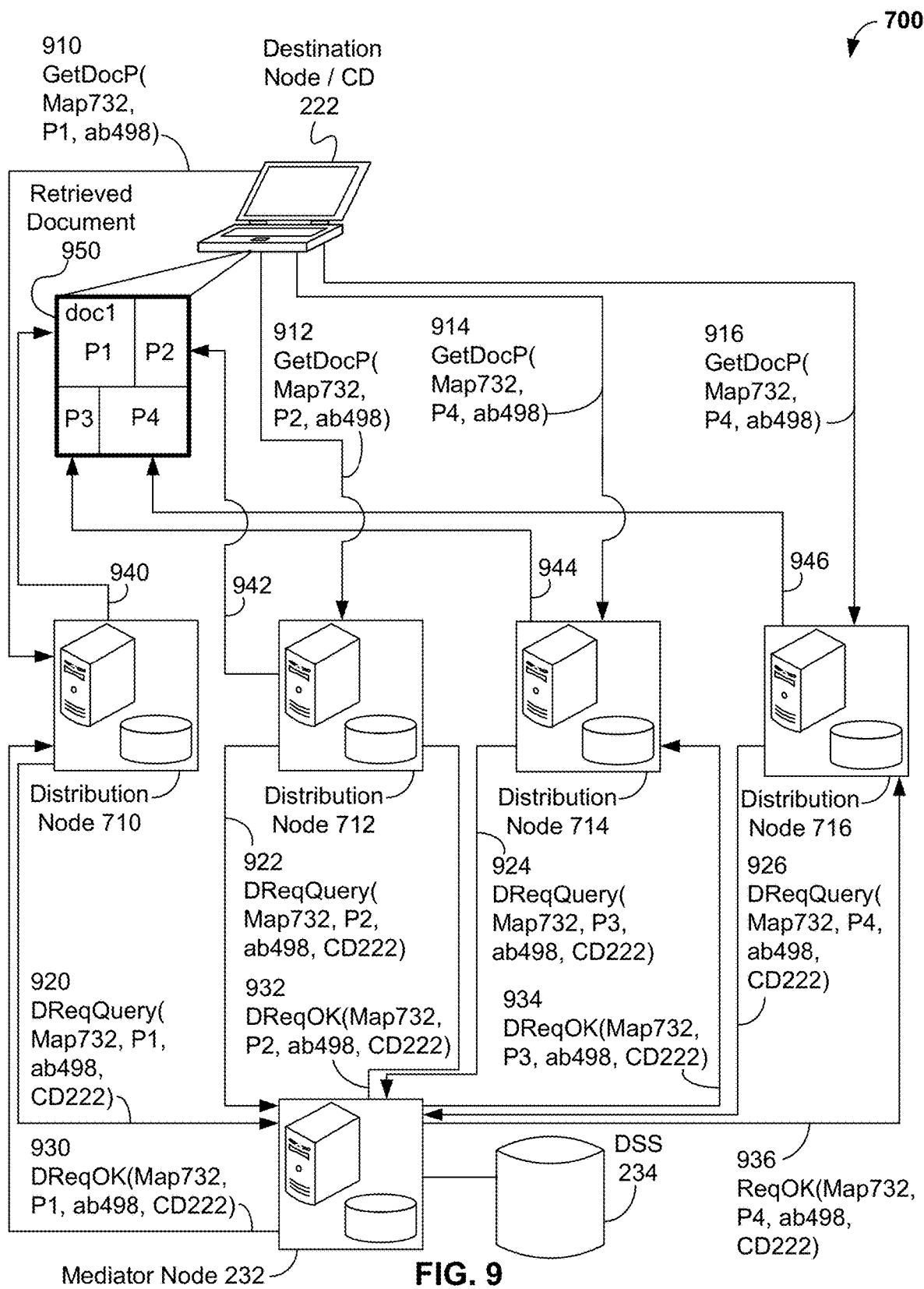

FIG. 9 illustrates that scenario 700 continues with computing device 222 proceeding with method 500 by sending get document portion messages 910, 912, 914, 916 requesting respective portions P1, P2, P3, P4 of document 718 from respective distribution nodes 710, 712, 714, 716. Each of get document portion messages 910, 912, 914, 916 includes three parameters: a copy of map 732 as a parameter identifying a document (in scenario 700, document 718), a parameter indicating which portion of document 718 is being requested from the distribution node receiving the message, and a parameter for a distribution transaction identifier for the specific transaction of distributing document 718 whose value is ab498 in scenario 700. In other scenarios, a request for a portion of a document from a distribution node can have more, fewer, and/or other parameters.

Scenario 700 proceeds with distribution nodes 710, 712, 714, 716 receiving respective get document portion messages 910, 912, 914, 916 and responsively generating respective document request query messages 920, 922, 924, 926 to mediator node 232. In scenario 700, a document request query message can be sent from a distribution node to mediator node 232 to inquire whether a received request for a document portion (e.g., a received get document portion message) is valid, where the document request query message has four parameters. Those parameters include: a copy of map 732 as a parameter identifying a document (in scenario 700, document 718), a parameter indicating which portion of document 718 is being requested from the distribution node receiving the message, a parameter for a distribution transaction identifier for the specific transaction of distributing document 718 (in scenario 700, the distribution transaction identifier is ab498) and a parameter identifying a destination node requesting the portion of document 718 (in scenario 700, the destination node is computing device 222). In other scenarios, a document request query message can have more, fewer, and/or different parameters.

In response to each of document request query messages 920, 922, 924, 926, mediator node 232 searches the distributed ledger provided by distributed storage system 234 for transactions associated with the distribution transaction identifier provided in the message; that is, mediator node 232 uses the distribution transaction identifier as a search index for searching the distributed ledger. In scenario 700, mediator node 232 finds that distribution transaction identifier is associated with record distribution transaction 820 stored in the distributed ledger and therefore determines that the request for a portion of document 718 is valid. In other scenarios where mediator node 232 does not find a record distribution transaction associated with a distribution transaction identifier provided in a document request query (or other) message, mediator node 232 can determine that the request for a portion of a document is invalid.

Then, scenario 700 continues with mediator node 232 responding to document request query messages 920, 922, 924, 926 by sending respective document request OK messages 930, 932, 934, 936 to respective distribution nodes 710, 712, 714, 716. In scenario 700, a document request OK message indicates that mediator node 232 has determined that a corresponding document request is valid, where the document request OK message has four parameters: a copy of map 732 as a parameter identifying a document (in scenario 700, document 718), a parameter indicating which portion of document 718 is being requested, a parameter for a distribution transaction identifier for the specific transaction of distributing document 718 (in scenario 700, the distribution transaction identifier is ab498) and a parameter identifying a destination node requesting the portion of document 718 (in scenario 700, the destination node is computing device 222). In other scenarios, a document request OK message can have more, fewer, and/or different parameters.

In response to receiving document request OK messages 930, 932, 934, 936, each respective distribution nodes 710, 712, 714, 716 retrieves its respective document portion P1, P2, P3, P4 of document 718 from the region of memory allocated for storage of document portions and sends respective message 940, 942, 944, 946 with its respective document portion P1, P2, P3, P4 to computing device 222. Then, computing device 222 acting as a distribution node proceeds with carrying out method 500 by receiving messages 940, 942, 944, 946 and assembling portions P1, P2, P3, P4 into a copy of document 718. In scenario 700, computing device 222 uses the physical location information provided in map 732 to assemble respective portions P1, P2, P3, P4 into a copy of document 718. FIG. 9 shows the assembled copy of document 718 as retrieved document 950.

Figure 10:
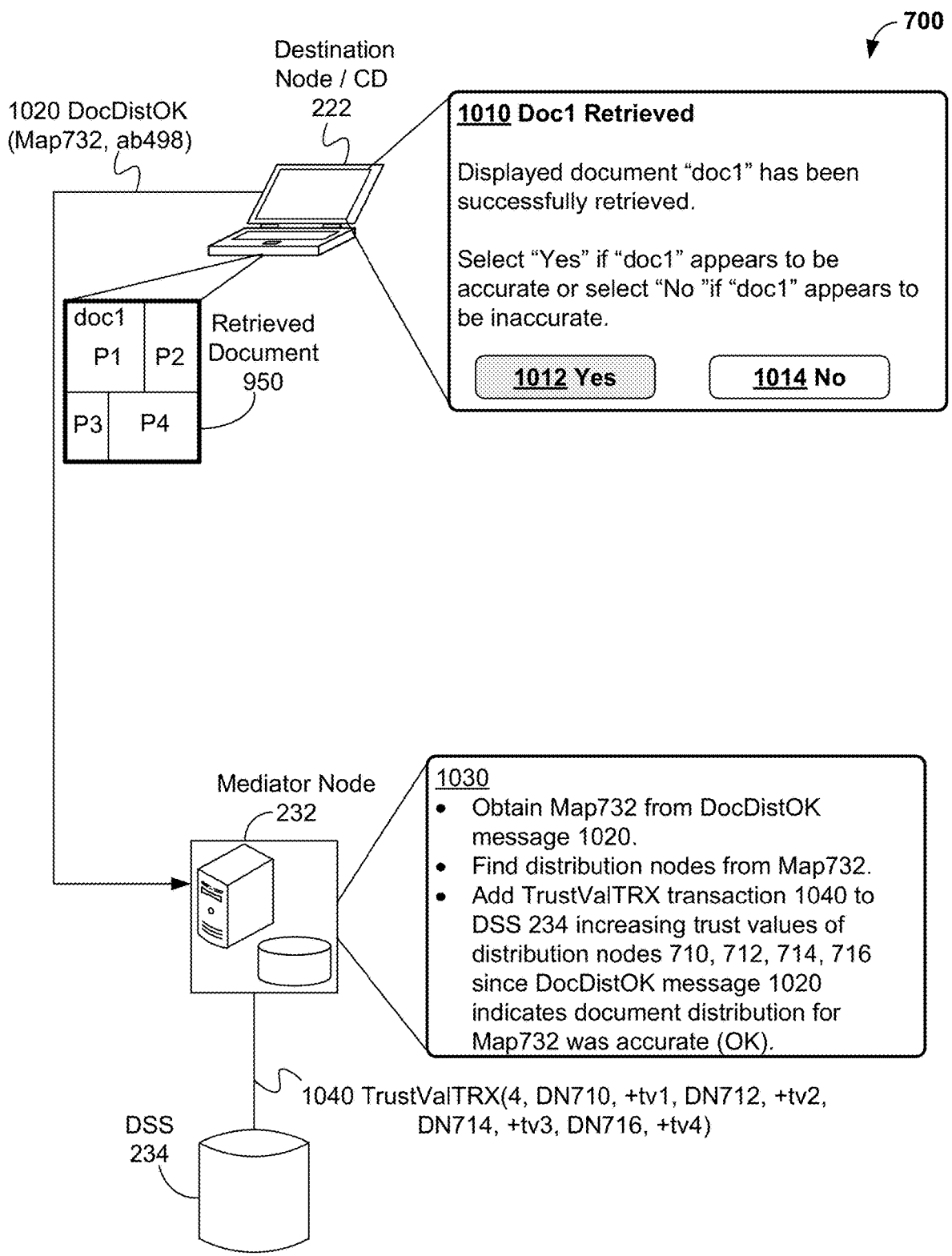

FIG. 10 indicates that, after assembling portions P1, P2, P3, P4 into retrieved document 950, computing device 222 displays retrieved document 950 and dialog 1010, where dialog 1010 includes yes button 1012 and no button 1014. Dialog 1010 indicates that retrieved document 950 named "doc1" has been "successfully retrieved" and is being "[d]isplayed". Dialog 1010 also requests that a user of computing device 222 select yes button 1012 "if 'doc1' appears to be accurate" or select no button 1014 "if 'doc1' appears to be inaccurate", where doc1 is the document name for retrieved document 950. In scenario 700, the user of computing device 222 selects yes button 1012, which is shown in grey in FIG. 10 to indicate selection, to indicate to computing device 222 that retrieved document 950 appears to be accurate.

After receiving input via yes button 1012 that retrieved document 950 appears to be accurate, computing device 222 proceeds with method 500 by generating document distribution OK message 1020 and sending document distribution OK message 1020 to mediator node 232, where document distribution OK message 1020 can indicate to mediator node 232 that retrieved document 950 appears to be accurate and thereby act as a trust value transaction for increasing trust values of distribution nodes associated with retrieved document 950. Document distribution OK message 1020 has two parameters: a copy of map 732 as a parameter identifying the document whose distribution appears to have been accurate (in scenario 700, document 718 distributed as retrieved document 950), and a parameter for a distribution transaction identifier for the specific transaction where the document distribution was accurate (in scenario 700, the distribution transaction identifier is ab498). In other scenarios, a document distribution OK message can have more, fewer, and/or different parameters.

After receiving document distribution OK message 1020, mediator node 232 performs the procedures of block 1030 in accord with method 500 to increase the trust values of distribution nodes 710, 712, 714, 716 that accurately distributed document 718/retrieved document 950. In particular, mediator node 232 obtains map 732 from document distribution OK message 1020 and finds that map 732 indicates that distribution nodes 710, 712, 714, 716 from Map 732 distributed document 718/retrieved document 950. Mediator node 232 then generates trust value transaction 1040 to increase the trust values of distribution nodes 710, 712, 714, 716 since document distribution OK message 1020 indicates document distribution of document 718/retrieved document 950 was accurate.

FIG. 10 shows that trust value transaction 1040 includes nine parameters: a count parameter whose value is "4" indicating a number of nodes whose trust values are being updated, and four (node, trust value update) pairs of trust update parameters, where each pair of trust update parameters indicating a node parameter identifying a node whose trust value is to be updated and a trust value update parameter indicating how the node's trust value is to be updated. For example, the four pairs of trust update parameters of trust value transaction 1040 are: ("DN710", "+tv1") that updates the trust value of a node identified as "DN710", which is distribution node 710, by a trust value update whose amount is specified as "+tv1"; ("DN712", "+tv2") that updates the trust value of a node identified as "DN712", which is distribution node 712, by a trust value update whose amount is specified as "+tv2"; ("DN714", "+tv3") that updates the trust value of a node identified as "DN714", which is distribution node 714, by a trust value update whose amount is specified as "+tv3"; and ("DN716", "+tv4") that updates the trust value of a node identified as "DN716", which is distribution node 716, by a trust value update whose amount is specified as "+tv4". In scenario 700, each of tv1, tv2, tv3, and tv4 is the same positive value, and thus trust value transaction 1040 increases a trust value of each of distribution nodes 710, 712, 714, 716 by the same positive value.

Mediator node 232 then sends trust value transaction 1040 to distributed storage system 234. Upon reception of trust value transaction 1040, distributed storage system 234 stores data in the distributed ledger indicating that trust values of distribution nodes 710, 712, 714, 716 are updated by respective values +tv1, +tv2, +tv3, +tv4. After the trust values of distribution nodes 710, 712, 714, 716 are updated in the distributed ledger stored by distributed storage system 234, scenario 700 ends.

IV. Example Methods of Operation

FIG. 11 is a flowchart of method 1100, in accordance with at least some example embodiments. Method 1100 can be carried out by a computing device acting as a source node, such as computing device 100, computing device 220, 222, distribution node(s) 230, 710, 712, 714, 716, mediator node(s) 232, distributed storage system 234, and/or a printing device; e.g., scanning/printing device 210, 212, 214, 216.

Method 1100 can begin at block 1110, where the source node can determine a map for a document, where the map for the document can include information about a number of portions of the document and a corresponding number of distribution nodes, such as discussed herein at least in the context of FIGS. 3 and 7.

In some examples, the information about the number of portions of the document and the corresponding number of distribution nodes can include: information about a location of the document associated with a particular portion of the number of portions of the document; and information about a distribution node storing the particular portion of the number of portions of the document, such as discussed herein at least in the context of FIGS. 3 and 7. In other examples, determining the map for the document using the source node can include: determining the number of portions of the document; for each portion of the document of the number of portions of the document, determining a location within the document for the portion of the document and a distribution node corresponding to the portion of the document; and determining the map for the document, where the map for the document includes an identifier for the document, the number of portions of the document, information about locations within the document for the number of portions of the document, and information about the number of distribution nodes, such as discussed herein at least in the context of FIGS. 3 and 7. In other examples, the source node and the number of distribution nodes can be arranged in a peer-to-peer network, such as discussed herein at least in the context of FIG. 7.

At block 1120, the source node can, for each portion of the number of portions of the document, send the portion of the document from the source node to the corresponding distribution node, such as discussed herein at least in the context of FIGS. 3 and 7.

At block 1130, the source node can be used to record a first transaction at a distributed storage system to record information related to the map for the document, such as discussed herein at least in the context of FIGS. 3 and 7. In some examples, recording the first transaction at the distributed storage system can include storing a copy of the map for the document at the distributed storage system, such as discussed herein at least in the context of FIGS. 3 and 7.

At block 1140, the source node can determine to distribute the document, such as discussed herein at least in the context of FIGS. 3 and 8.

At block 1150, after determining to distribute the document, the source node can: record a second transaction at the distributed storage system, the second transaction related to a distribution identifier associated with the map for the document, and send a distribution notification that includes the map for the document and the distribution identifier, such as discussed herein at least in the context of FIGS. 3 and 8. In some examples, the second transaction can include the map for the document and the distribution identifier, such as discussed herein at least in the context of FIGS. 3 and 8.

In some examples, method 1100 can further include: generating an output of the source node related to the document, such as discussed herein at least in the context of FIGS. 3, 7, and 8.

FIG. 12 is a flowchart of method 1200, in accordance with at least some example embodiments. Method 1200 can be carried out by a computing device acting as a destination node, such as computing device 100, computing device 220, 222, distribution node(s) 230, 710, 712, 714, 716, mediator node(s) 232, distributed storage system 234, and/or a printing device; e.g., scanning/printing device 210, 212, 214, 216.

Method 1200 can begin at block 1210, where the destination node can receive a distribution notification that includes a map for a document and a distribution identifier, the map for the document including information about a number of portions of the document and a corresponding number of distribution nodes, such as discussed herein at least in the context of FIGS. 5 and 8. In some examples, the destination node and the number of distribution nodes can be arranged in a peer-to-peer network, such as discussed herein at least in the context of FIG. 7.

At block 1220, for each portion of the number of portions of the document, the destination node can send a request for the portion of the document to the corresponding distribution node, where the request includes the distribution identifier, such as discussed herein at least in the context of FIGS. 5 and 9.

In some examples, sending a request for the portion of the document to the corresponding distribution node for each portion of the number of portions of the document can include the destination node sending a first request for a first portion of the document to a first distribution node of the number of distribution nodes: then, receiving the document at the destination node can include: querying, by the first distribution node, a distributed storage system to determine whether the first request is valid; and after determining that the first request is valid, the first distribution node sending the first portion of the document to the destination node, such as discussed herein at least in the context of FIGS. 5 and 9.

In other examples, sending a request for the portion of the document to the corresponding distribution node for each portion of the number of portions of the document can include the destination node sending a first request for a first portion of the document to a first distribution node of the number of distribution nodes; then, receiving the document at the destination node can include: querying, by the first distribution node, a distributed storage system to determine whether the first request is not valid; and after determining that the first request is not valid, the first distribution node discarding the first request, such as discussed herein at least in the context of FIG. 5.

At block 1230, the destination node can receive a document by receiving at least one portion of the number of portions of the document, such as discussed herein at least in the context of FIGS. 5 and 9.

At block 1240, the destination node can determine an accuracy of the received document, such as discussed herein at least in the context of FIGS. 5 and 10.

At block 1250, after determining the accuracy of the received document, the destination node can send a notification related to the accuracy of the received document, such as discussed herein at least in the context of FIGS. 5 and 10.

In some examples, method 1200 can further include: after sending the notification related to the accuracy of the received document, recording a third transaction associated with a trust value for at least one distribution node of the number of distribution nodes using a distributed storage system, where the trust value is based on the accuracy of the received document, such as discussed herein at least in the context of FIGS. 5 and 10. In some of these examples, recording the third transaction associated with the trust value for at least one distribution node of the number of distribution nodes can include: determining whether the notification related to the accuracy of the received document indicates that the received document is accurate; and after determining that the notification related to the accuracy of the received document indicates that the received document is accurate, recording a transaction to increase a trust value for at least one distribution node of the number of distribution nodes using a distributed storage system, such as discussed herein at least in the context of FIGS. 5 and 10. In other of these examples, recording the third transaction associated with the trust value for at least one distribution node of the number of distribution nodes can include: determining whether the notification related to the accuracy of the received document indicates that the received document is not accurate; and after determining that the notification related to the accuracy of the received document indicates that the received document is not accurate, recording a transaction to decrease a trust value for at least one distribution node of the number of distribution nodes using a distributed storage system, such as discussed herein at least in the context of FIG. 5.

In some examples, method 1200 can further include: generating an output of the destination node related to the received document, such as discussed above at least in the context of FIGS. 5, 8, and 10.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
   determining a map for a document using a source node, the map for the document comprising information about portions of the document, including hash sums calculated by the source node for each of the portions of the document, and a corresponding number of distribution nodes;
   for each of the portions of the document:
      selecting a distribution node based on a trust value associated with the distribution node, and wherein the distribution node is eligible for selection to store one of the portions of the document if the trust value is larger than a trust-value threshold, and
      sending the portion of the document from the source node to the selected distribution node;
   recording, via a mediator node, a first transaction at a distributed storage system to record information related to the map for the document using the source node;
   determining, at the source node, to distribute the document; and
   after determining to distribute the document, the source node:
      recording, via the mediator node, a second transaction at the distributed storage system, the second transaction related to a distribution identifier associated with the map for the document, and sending a distribution notification that comprises the map for the document and the distribution identifier;
receiving, via a destination node, each of the portions of the document from each of the selected distribution nodes;
calculating, via the destination node, hash sums of each of the received portions of the document;
comparing, via the destination node, the calculated hash sum for each received portion of the document with the corresponding hash sum in the map for the document calculated by the source node for each of the portions of the document; and
if the compared hash sums are the same,
(i) determining, via the destination node, that an assembled copy of the document is accurate,
(ii) sending, via the destination node, a trust value transaction to the mediator node to increase the trust value of each of the selected distribution nodes, and
(iii) recording, via the mediator node, the trust value transaction at the distributed storage system;
if the compared hash sums are different,
(i) determining, via the destination node, that an assembled copy of the document is inaccurate,
(ii) sending, via the destination node, a trust value transaction to the mediator node to decrease the trust value of each of the selected distribution nodes, and
(iii) recording, via the mediator node, the trust value transaction at the distributed storage system.

2. The method of claim 1, wherein the information about the number of portions of the document and the corresponding number of distribution nodes comprises:
information about a location of the document associated with a particular portion of the portions of the document; and
information about a distribution node storing the particular portion of the portions of the document.

3. The method of claim 1, wherein the second transaction comprises the map for the document and the distribution identifier.

4. The method of claim 1, wherein determining the map for the document using the source node comprises:
determining a number of portions of the document;
for each portion of the document of the number of portions of the document, determining a location within the document for the portion of the document; and
determining the map for the document, wherein the map for the document includes an identifier for the document, the number of portions of the document, information about locations within the document for the number of portions of the document, and information about the number of distribution nodes.

5. The method of claim 1, wherein recording, via the mediator node, the first transaction at the distributed storage system comprises storing, via the mediator node, a copy of the map for the document at the distributed storage system.

6. The method of claim 1, wherein the source node, the number of distribution nodes, and the mediator node are arranged in a peer-to-peer network.

7. The method of claim 1, further comprising:
generating an output of the source node related to the document.

8. A method, comprising:
receiving, at a destination node, a distribution notification that comprises a map for a document and a distribution identifier, the map for the document comprising information about a portions of the document, including hash sums calculated by the source node for each of the portions of the document, and a corresponding number of distribution nodes;
for each of the portions of the document, the destination node sending a request for the portion of the document to the corresponding distribution node, wherein the request comprises the distribution identifier and a search index;
the corresponding distribution nodes each determining whether the search index is valid;
if the search index is determined to be invalid, the corresponding distribution nodes each sending at least one mediator node an indication that the request for the portion of the document is invalid, the at least one mediator node decreasing a trust value associated with the destination node, and the at least one mediator node determining if the trust value of the destination node is below a trust-value threshold such that the destination node is prohibited from sending document requests;
if the search index is determined to be valid, receiving a document at the destination node by receiving at least one portion of the portions of the document;
calculating, via the destination node, hash sums of each of the received portions of the document;
comparing, via the destination node, the calculated hash sum for each received portion of the document with the corresponding hash sum in the map for the document; and
if the compared hash sums are the same,
(i) determining, via the destination node, that an assembled copy of the document is accurate, and
(ii) sending, via the destination node, a trust value transaction to the mediator node to increase the trust value of each of the selected distribution nodes;
if the compared hash sums are different,
(i) determining, via the destination node, that an assembled copy of the document is inaccurate, and
(ii) sending, via the destination node, a trust value transaction to the mediator node to decrease the trust value of each of the selected distribution nodes.

9. The method of claim 8, wherein for each portion of the number of portions of the document, the destination node sending a request for the portion of the document to the corresponding distribution node comprises sending a first request for a first portion of the document to a first distribution node of the number of distribution nodes; and
wherein receiving the document at the destination node comprises:
querying, by the first distribution node, the at least one mediator node to determine whether the first request is valid; and
after determining that the first request is valid, the first distribution node sending the first portion of the document to the destination node.

10. The method of claim 8, wherein for each portion of the number of portions of the document, the destination node sending a request for the portion of the document to the corresponding distribution node comprises sending a first request for a first portion of the document to a first distribution node of the number of distribution nodes; and
wherein receiving the document at the destination node comprises:
querying, by the first distribution node, the at least one mediator node to determine whether the first request is not valid; and
after determining that the first request is not valid, the first distribution node discarding the first request.

11. The method of claim 8, further comprising:
after sending the notification related to the accuracy of the received document, recording a third transaction associated with the trust value for at least one distribution node of the number of distribution nodes using the at least one mediator node, wherein the trust value is based on the accuracy of the received document.

12. The method of claim 11, wherein recording the third transaction associated with the trust value for the at least one distribution node of the number of distribution nodes comprises:
determining whether the notification related to the accuracy of the received document indicates that the received document is accurate; and
after determining that the notification related to the accuracy of the received document indicates that the received document is accurate, recording a transaction to increase a trust value for at least one distribution node of the number of distribution nodes using the at least one mediator node, wherein the at least one mediator node stores the increased trust value at a distributed storage system.

13. The method of claim 11, wherein recording the third transaction associated with the trust value for the at least one distribution node of the number of distribution nodes comprises:
determining whether the notification related to the accuracy of the received document indicates that the received document is not accurate; and
after determining that the notification related to the accuracy of the received document indicates that the received document is not accurate, recording a transaction to decrease a trust value for at least one distribution node of the number of distribution nodes using the at least one mediator node, wherein the at least one mediator node stores the increased trust value at a distributed storage system.

14. The method of claim 8, wherein the destination node, the number of distribution nodes, and the plurality of mediator nodes are arranged in a peer-to-peer network.

15. The method of claim 8, further comprising:
generating an output of the destination node related to the received document.

16. A source node, comprising:
one or more hardware processors; and
data storage device configured to store computer-readable instructions that, when executed b the one or more hardware processors, cause the source node to perform tasks comprising:
determining a map for a document using a source node, the map for the document comprising information about portions of the document, including hash sums calculated by the source node for each of the portions of the document, and a corresponding number of distribution nodes;
for each of the portions of the document: selecting a distribution node based on a trust value associated with the distribution node, and wherein the distribution node is eligible for selection to store one of the portions of the document if the trust value is larger than a trust-value threshold, and
sending the portion of the document from the source node to the selected distribution node;
recording, via a mediator node, a first transaction at a distributed storage system to record information related to the map for the document using the source node;
determining, at the source node, to distribute the document; and
after determining to distribute the document, the source node:
recording, via the mediator node, a second transaction at the distributed storage system, the second transaction related to a distribution identifier associated with the map for the document, and sending a distribution notification that comprises the map for the document and the distribution identifier;
receiving, via a destination node, each of the portions of the document from each of the selected distribution nodes;
calculating, via the destination node, hash sums of each of the received portions of the document;
comparing, via the destination node, the calculated hash sum for each received portion of the document with the corresponding hash sum in the map for the document calculated by the source node for each of the portions of the document;
if the compared hash sums are the same,
(i) determining, via the destination node, that an assembled copy of the document is accurate,
(ii) sending, via the destination node, a trust value transaction to the mediator node to increase the trust value of each of the selected distribution nodes, and
(iii) recording, via the mediator node, the trust value transaction at the distributed storage system;
if the compared hash SUMS are different,
(i) determining, via the destination node, that an assembled copy of the document is inaccurate,
(ii) sending, via the destination node, a trust value transaction to the mediator node to decrease the trust value of each of the selected distribution nodes, and
(iii) recording, via the mediator node, the trust value transaction at the distributed storage system.

17. The source node of claim 16, wherein the information about the portions of the document and the corresponding number of distribution nodes comprises:
information about a location of the document associated with a particular portion of the portions of the document; and
information about a distribution node storing the particular portion of the portions of the document.

18. The source node of claim 16, wherein the second transaction comprises the map for the document and the distribution identifier.

19. The source node of claim 16, wherein determining the map for the document using the source node comprises:
determining a number of portions of the document;
for each of the number of the portions of the document, determining a location within the document for the portion of the document; and
determining the map for the document, wherein the map for the document includes an identifier for the document, the number of portions of the document, information about locations within the document for the number of portions of the document, and information about the number of distribution nodes.

20. The source node of claim 16, wherein recording, via the mediator node, the first transaction at the distributed storage system comprises storing, via the mediator node, a copy of the map for the document at the distributed storage system.

* * * * *